US011253126B2

(12) United States Patent
Jang et al.

(10) Patent No.: US 11,253,126 B2
(45) Date of Patent: Feb. 22, 2022

(54) ROBOT CLEANER

(71) Applicant: LG ELECTRONICS INC., Seoul (KR)

(72) Inventors: Jaewon Jang, Seoul (KR); Jeongseop Park, Seoul (KR); Sungho Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 147 days.

(21) Appl. No.: 16/333,135

(22) PCT Filed: Jul. 14, 2017

(86) PCT No.: PCT/KR2017/007552
§ 371 (c)(1),
(2) Date: Mar. 13, 2019

(87) PCT Pub. No.: WO2018/012915
PCT Pub. Date: Jan. 18, 2018

(65) Prior Publication Data
US 2019/0216285 A1    Jul. 18, 2019

Related U.S. Application Data

(60) Provisional application No. 62/362,358, filed on Jul. 14, 2016.

(51) Int. Cl.
*A47L 11/283* (2006.01)
*A47L 11/293* (2006.01)
(Continued)

(52) U.S. Cl.
CPC ............. *A47L 11/283* (2013.01); *A47L 9/009* (2013.01); *A47L 9/0606* (2013.01);
(Continued)

(58) Field of Classification Search
CPC ............................................. A47L 11/00–4097
See application file for complete search history.

(56) References Cited

U.S. PATENT DOCUMENTS 3,381,334 A    5/1968    Redmond
3,827,099 A    8/1974    Allaire et al.
(Continued)

FOREIGN PATENT DOCUMENTS

CN    1568156 A    1/2005
CN    1721815 A    1/2006
(Continued)

OTHER PUBLICATIONS

PCT Search Report dated Sep. 28, 2017, on PCT International Patent appl. No. PCT/KR2017/007549.
(Continued)

*Primary Examiner* — Spencer E. Bell
*Assistant Examiner* — Omair Chaudhri
(74) *Attorney, Agent, or Firm* — Finnegan, Henderson, Farabow, Garrett & Dunner, LLP

(57) ABSTRACT

A robot cleaner includes a main body, a moving unit for moving the main body, a cleaning module capable of being brought into contact with a floor surface at at least part of a lower surface thereof, and a module drive unit for controlling an angle of inclination of the lower surface of the cleaning module with respect to the floor surface.

10 Claims, 23 Drawing Sheets

(51) Int. Cl.

| | |
|---|---|
| *A47L 11/14* | (2006.01) |
| *A47L 11/282* | (2006.01) |
| *B08B 3/04* | (2006.01) |
| *B08B 3/08* | (2006.01) |
| *A47L 11/292* | (2006.01) |
| *A47L 11/40* | (2006.01) |
| *A47L 11/16* | (2006.01) |
| *A47L 11/20* | (2006.01) |
| *A47L 13/20* | (2006.01) |
| *A47L 11/34* | (2006.01) |
| *B25J 9/16* | (2006.01) |
| *B25J 11/00* | (2006.01) |
| *G05D 1/02* | (2020.01) |
| *A47L 9/00* | (2006.01) |
| *A47L 9/06* | (2006.01) |
| *B25J 5/00* | (2006.01) |
| *B25J 9/00* | (2006.01) |
| *B25J 9/12* | (2006.01) |
| *B08B 1/04* | (2006.01) |
| *A47L 9/28* | (2006.01) |
| *A47L 11/24* | (2006.01) |
| *A47L 11/00* | (2006.01) |

(52) U.S. Cl.
CPC ........... *A47L 9/2826* (2013.01); *A47L 9/2852* (2013.01); *A47L 11/14* (2013.01); *A47L 11/16* (2013.01); *A47L 11/161* (2013.01); *A47L 11/20* (2013.01); *A47L 11/201* (2013.01); *A47L 11/24* (2013.01); *A47L 11/282* (2013.01); *A47L 11/292* (2013.01); *A47L 11/293* (2013.01); *A47L 11/34* (2013.01); *A47L 11/40* (2013.01); *A47L 11/4002* (2013.01); *A47L 11/4005* (2013.01); *A47L 11/405* (2013.01); *A47L 11/408* (2013.01); *A47L 11/4011* (2013.01); *A47L 11/4013* (2013.01); *A47L 11/4038* (2013.01); *A47L 11/4058* (2013.01); *A47L 11/4061* (2013.01); *A47L 11/4066* (2013.01); *A47L 11/4069* (2013.01); *A47L 11/4072* (2013.01); *A47L 11/4083* (2013.01); *A47L 11/4088* (2013.01); *A47L 13/20* (2013.01); *B08B 1/04* (2013.01); *B08B 3/041* (2013.01); *B08B 3/08* (2013.01); *B25J 5/007* (2013.01); *B25J 9/0003* (2013.01); *B25J 9/126* (2013.01); *B25J 9/1664* (2013.01); *B25J 9/1666* (2013.01); *B25J 11/0085* (2013.01); *G05D 1/0223* (2013.01); *A47L 11/00* (2013.01); *A47L 11/145* (2013.01); *A47L 2201/00* (2013.01); *A47L 2201/04* (2013.01); *A47L 2201/06* (2013.01); *B08B 2203/00* (2013.01); *G05D 2201/0203* (2013.01)

(56) References Cited

U.S. PATENT DOCUMENTS

| | | | |
|---|---|---|---|
| 4,418,342 | A | 11/1983 | Aschoff et al. |
| 5,991,951 | A | 11/1999 | Kubo et al. |
| 6,493,896 | B1 | 12/2002 | Stuchlik et al. |
| 7,320,149 | B1 | 1/2008 | Huffman et al. |
| 9,814,364 | B1 | 11/2017 | Caruso |
| 2004/0163199 | A1 | 8/2004 | Hsu |
| 2004/0221474 | A1 | 11/2004 | Slutsky et al. |
| 2005/0015913 | A1 | 1/2005 | Kim et al. |
| 2005/0166356 | A1 | 8/2005 | Uehigashi |
| 2005/0183230 | A1 | 8/2005 | Uehigashi |
| 2006/0185690 | A1 | 8/2006 | Song |
| 2007/0261715 | A1 | 11/2007 | Lee et al. |
| 2010/0031463 | A1 | 2/2010 | Adams et al. |
| 2012/0084938 | A1 | 4/2012 | Fu |
| 2012/0125363 | A1 | 5/2012 | Kim et al. |
| 2013/0096717 | A1 | 4/2013 | Yoon et al. |
| 2013/0263889 | A1 | 10/2013 | Yoon et al. |
| 2014/0130289 | A1* | 5/2014 | Hyun ............. A47L 11/4083 15/319 |
| 2014/0196231 | A1* | 7/2014 | Park ............. A47L 11/4069 15/98 |
| 2014/0209122 | A1* | 7/2014 | Jung ............. A47L 11/4088 134/18 |
| 2015/0142169 | A1* | 5/2015 | Kim ............. A47L 11/4061 700/245 |
| 2015/0143646 | A1* | 5/2015 | Jeong ............. A47L 11/4088 15/98 |
| 2015/0150429 | A1 | 6/2015 | Yoo et al. |
| 2015/0182090 | A1* | 7/2015 | Park ............. A47L 11/4063 15/98 |
| 2015/0196183 | A1* | 7/2015 | Clark ............. B24B 23/005 451/353 |
| 2016/0022109 | A1* | 1/2016 | Dooley ............. A47L 11/4036 134/18 |
| 2016/0051108 | A1 | 2/2016 | Huang et al. |
| 2018/0120833 | A1 | 5/2018 | Lindhe et al. |
| 2019/0270124 | A1 | 9/2019 | Jang et al. |

FOREIGN PATENT DOCUMENTS

| | | |
|---|---|---|
| CN | 1823677 | 8/2006 |
| CN | 2817718 U | 9/2006 |
| CN | 101267759 A | 9/2008 |
| CN | 101305893 A | 11/2008 |
| CN | 101313829 | 4/2012 |
| CN | 202341952 U | 7/2012 |
| CN | 102652654 | 9/2012 |
| CN | 103006153 | 4/2013 |
| CN | 203113255 U | 8/2013 |
| CN | 203296009 U | 11/2013 |
| CN | 103717117 A | 4/2014 |
| CN | 104244794 A | 12/2014 |
| CN | 104337469 | 2/2015 |
| CN | 104918529 A | 5/2015 |
| CN | 104757906 | 7/2015 |
| CN | 105744874 | 7/2016 |
| CN | 205411088 U | 8/2016 |
| EP | 2702918 A1 | 3/2014 |
| EP | 2762051 A2 | 8/2014 |
| EP | 3485785 | 5/2019 |
| JP | H03123522 A | 5/1991 |
| JP | H05-300860 | 11/1993 |
| JP | H11-178764 | 7/1999 |
| JP | 2000-051128 | 2/2000 |
| JP | 2000070203 A | 3/2000 |
| JP | 2005-006816 | 1/2005 |
| JP | 2009-056216 | 3/2009 |
| JP | 2014-045898 | 3/2014 |
| KR | 20-0195057 | 9/2000 |
| KR | 10-2002-0074985 | 10/2002 |
| KR | 10-2005-0012047 | 1/2005 |
| KR | 10-2005-0014652 | 2/2005 |
| KR | 20-0412179 U | 3/2006 |
| KR | 20-0413777 | 4/2006 |
| KR | 10-2006-0094374 | 8/2006 |
| KR | 10-0669889 | 1/2007 |
| KR | 20-0435111 U | 1/2007 |
| KR | 10-0822785 | 4/2008 |
| KR | 10-2009-0026031 | 3/2009 |
| KR | 10-20090086657 | 8/2009 |
| KR | 10-2009-0119638 | 11/2009 |
| KR | 10-2010-006151 | 1/2010 |
| KR | 20-2010-0001717 U | 2/2010 |
| KR | 10-0962121 | 6/2010 |
| KR | 10-0985376 | 10/2010 |
| KR | 10-2010-0133870 | 12/2010 |
| KR | 10-1000178 | 12/2010 |
| KR | 10-2011-0105305 | 9/2011 |
| KR | 10-1073102 | 11/2011 |
| KR | 20-0458863 | 3/2012 |

(56) References Cited

FOREIGN PATENT DOCUMENTS

| KR | 20-2012-0002399 U | 4/2012 | | |
|---|---|---|---|---|
| KR | 10-2012-0042391 | 5/2012 | | |
| KR | 10-2012-0055891 | 6/2012 | | |
| KR | 10-2012-0100682 | 9/2012 | | |
| KR | 10-20130042423 | 4/2013 | | |
| KR | 10-1303159 | 9/2013 | | |
| KR | 10-2013-0129059 | 11/2013 | | |
| KR | 10-20140022472 | 2/2014 | | |
| KR | 10-2015-0014351 | 2/2015 | | |
| KR | 10-2015-0022133 | 3/2015 | | |
| KR | 10-2015-0031821 | 3/2015 | | |
| KR | 20150022133 A * | 3/2015 | | |
| KR | 10-2015-0048490 | 5/2015 | | |
| KR | 10-2015-0057959 | 5/2015 | | |
| KR | 10-1522177 | 5/2015 | | |
| KR | 10-2015-0060030 | 6/2015 | | |
| KR | 10-20150078094 | 7/2015 | | |
| KR | 10-2015-0107396 | 9/2015 | | |
| KR | 10-2015-0107693 | 9/2015 | | |
| KR | 10-20150107693 | 9/2015 | | |
| KR | 10-2015-0116311 | 10/2015 | | |
| KR | 10-1569058 | 11/2015 | | |
| KR | 10-2015-0139111 | 12/2015 | | |
| KR | 10-1578887 | 12/2015 | | |
| KR | 101578887 B1 * | 12/2015 | ............ | A47L 11/282 |
| KR | 10-1595727 | 2/2016 | | |
| KR | 10-20160033615 | 3/2016 | | |
| KR | 20160033615 A * | 3/2016 | .............. | F24S 40/20 |
| KR | 10-2016-0090570 | 8/2016 | | |
| KR | 10-2016-0104429 | 9/2016 | | |
| KR | 10-2016-0122520 | 10/2016 | | |
| KR | 10-1678443 | 12/2016 | | |
| KR | 10-2018-0105109 | 9/2018 | | |
| TW | 537326 U | 6/2003 | | |
| TW | M455464 | 6/2013 | | |
| WO | WO 2015/186944 A1 | 12/2015 | | |
| WO | WO 2016/027957 | 2/2016 | | |
| WO | WO 2016/036183 A1 | 3/2016 | | |

OTHER PUBLICATIONS

PCT Search Report dated Nov. 20, 2017, on PCT International Patent appl. No. PCT/KR2017/007555.
PCT Search Report dated Nov. 20, 2017, on PCT International Patent appl. No. PCT/KR2017/007552.
PCT Search Report dated Nov. 20, 2017, on PCT International Patent appl. No. PCT/KR2017/007550.
PCT Search Report dated Nov. 23, 2017, on PCT International Patent appl. No. PCT/KR2017/007561.
PCT Search Report dated Nov. 23, 2017, on PCT International Patent appl. No. PCT/KR2017/007557.
PCT Search Report dated Nov. 23, 2017, on PCT International Patent appl. No. PCT/KR2017/007560.
PCT Search Report dated Nov. 23, 2017, on PCT International Patent appl. No. PCT/KR2017/007562.
Taiwan Office Action dated Dec. 18, 2018, on Taiwan Patent appl. No. 107101303.
Taiwan Office Action dated Dec. 25, 2018, on Taiwan Patent appl. No. 107101297.
Taiwan Office Action dated Sep. 18, 2019, on Taiwan Patent appl. No. 107101298.
Korean Notice of Allowance dated Jun. 17, 2019, on Korean Patent appl. No. 10-2018-0110855.
Korean Notice of Allowance dated Jun. 29, 2018, on Korean Patent appl. No. 10-2017-0009364.
Australian Office Action dated Jul. 16, 2019, on Australian Patent appl. No. 2017297104.
PCT Search Report dated Nov. 20, 2017, on PCT International Patent Application No. PCT/KR2017/007551.
European Search Report dated Mar. 31, 2020, on European Patent Application No. 17827982.4.
European Search Report dated May 4, 2020, on European Patent Application No. 17827984.0.
European Search Report dated Apr. 2, 2020, on European Patent Application No. 17827992.3.
U.S. Office Action dated May 22, 2020, on U.S. Appl. No. 16/333,098.
U.S. Office Action dated May 6, 2020, on U.S. Appl. No. 16/333,144.
Taiwan Office Action dated Oct. 30, 2018, on Taiwan Patent Application No. 107101299.
Korean Office Action dated Apr. 23, 2020, on Korean Patent Application No. 10-2018-7036043.
Korean Notice of Allowance dated Apr. 28, 2020, on Korean Patent Application No. 10-2018-7036042.
Korean Notice of Allowance dated Apr. 29, 2020, on Korean Patent Application No. 10-2018-7036039.
Taiwan Office Action dated May 22, 2020, on Taiwan Patent Application No. 107101298.
European Search Report dated May 26, 2020, on European Patent Application No. 17827993.1.
European Search Report dated May 26, 2020, on European Patent Application No. 17827985.7.
Korean Notice of Allowance dated Jul. 1, 2020, on Korean Patent Application No. 10-2018-7036041.
U.S. Office Action dated Jul. 15, 2020, on U.S. Appl. No. 16/333,129.
Chinese Office Action dated Jul. 22, 2020, on Chinese Patent Applicatuin Ni, 201780056575.7.
Chinese Office Action dated Aug. 3, 2020, on Chinese Patent Application No. 201780056675.X.
European Search Report dated Aug. 13, 2020, on European Patent Application No. 17827983.2.
Korean Office Action dated Aug. 19, 2020, on Korean Patent Application No. 10-2020-7014910.
Korean Notice of Allowance dated Jun. 29, 2018, on Korean Patent Application No. 10-2017-0009364.
Korean Notice of Allowance dated Jun. 17, 2019, on Korean Patent Application No. 10-2018-0110855.
Taiwan Office Action dated Dec. 24, 2018, on Taiwan Patent Application No. 107101298.
Chinese Office Action dated Sep. 21, 2020 on Chinese Patent Application No. 201780056578.0.
EP Search Report dated Aug. 14, 2020.
U.S. Office Action dated Sep. 21, 2020 on U.S. Appl. No. 16/333,138.
U.S. Office Action dated Oct. 6, 2020 on U.S. Appl. No. 16/333,124.
U.S. Office Action dated Oct. 9, 2020 on U.S. Appl. No. 16/333,135.
Office Action dated Jan. 28, 2021 issued by the U.S. Patent and Trademark Office on U.S. Appl. No. 16/333,147.

* cited by examiner (a)

(b)

ROBOT CLEANER

CROSS-REFERENCE TO RELATED APPLICATIONS

This application is a U.S. National Phase entry under 35 U.S.C. § 371 from PCT International Application No. PCT/KR2017/007552, filed Jul. 14, 2017, which claims the benefit of priority of U.S. Provisional Application No. 62/362,358, filed Jul. 14, 2016, the contents of which are incorporated herein by reference in its entirety.

TECHNICAL FIELD

The present invention relates to a robot cleaner, and more particularly to a robot cleaner equipped with a detachable cleaning module.

BACKGROUND ART

There is a recent trend towards increasing use of robots in homes. A representative example of such household robots is a robot cleaner. The robot cleaner, which is a movable robot, is able to automatically clean a certain space by sucking contaminants such as dust accumulated on a floor or by wiping the floor using a rotating mop while traveling in the space.

Korean Unexamined Patent Publication No. 10-2015-0018968 discloses a robot cleaner equipped with a rotating mop. However, because the robot cleaner using the rotating mop is designed to perform only a wet-type mopping operation using water, it is impossible to perform a mopping operation in a manner of wiping moisture.

DISCLOSURE

Technical Problem

It is an object of the present invention to provide a robot cleaner designed to perform a cleaning operation in a manner of mopping a floor.

It is another object of the present invention to provide a robot cleaner designed to efficiently perform a mopping operation depending on the traveling direction of the robot cleaner.

It is still another object of the present invention to provide a robot cleaner equipped with a cleaning module adapted to be easily replaceable.

It is a further object of the present invention to provide a movable robot capable of performing two kinds of cleaning operations on a floor surface during a single traveling motion of the robot cleaner.

Objects of the present invention are not limited to the above-mentioned objects, and other objects, which are not mentioned, will be apparent to those skilled in the art from the following disclosure.

Technical Solution

In order to accomplish the above objects, a robot cleaner according to the present invention includes a main body defining an appearance, a moving unit for moving the main body, a cleaning module capable of being brought into contact with a floor surface at at least part of a lower surface thereof, and a module drive unit for controlling an angle of inclination of the lower surface of the cleaning module with respect to the floor surface, thereby performing a cleaning operation on a floor surface by controlling the angle of inclination of the lower surface of the cleaning module of the robot cleaner with respect to the floor surface.

In order to accomplish the above objects, a mop-tilting member of the robot cleaner according to the present invention includes a tilting plate to which a mop is attached, a mop holder for holding the mop to the tilting plate, and a rotational-member-coupling portion projecting from a portion of the tilting plate and connected to the rotational member, and the tilting plate is convex outwards at one surface thereof that faces the floor surface, thereby performing a mopping operation while varying an angle of inclination of the tilting plate of the mop-tilting member.

In order to accomplish the above objects, the cleaning module of the robot cleaner according to the present invention includes a rotational protrusion disposed at a side of the rotational member and connected to the module drive unit, and a holding protrusion disposed at another side of the rotational member so as to support rotation of the rotational member, the cleaning module further including a coupler for coupling the cleaning module to a side of the main body, the main body including a module housing defining a space in which a portion of the cleaning module is received, the module housing being provided at a side thereof with a holding-protrusion-fitting groove into which the holding protrusion is fitted, and the holding protrusion housing and the coupler jointly holding the holding protrusion disposed at another side of the rotational member, thereby enabling the cleaning module to be detachably disposed in the main body.

In order to accomplish the above objects, the moving unit of the robot cleaner according to the present invention includes a spin-mop assembly including a mop pad disposed at a lower side thereof, the mop pad being rotated in a state of being in contact with the floor surface so as to perform a mopping operation, and a drive assembly for rotating the spin-mop assembly, the moving unit further including a supply assembly for supplying a stored liquid to the spin-mop assembly, thereby performing a wet-type mopping operation on a floor using the spin-mop assembly and wiping away moisture from the floor using the cleaning module.

Advantageous Effects

First, the robot cleaner according to the present invention includes a cleaning module and a module drive unit for controlling the angle of inclination of the lower surface of the cleaning module with respect to the floor surface. Accordingly, the robot cleaner according to the present invention has an advantage in that the angle of inclination of the lower surface of the cleaning module with respect to the floor surface can be controlled depending on the space to be cleaned or the manner of performing cleaning, thereby performing a cleaning operation in a manner of wiping the floor surface.

Second, the tilting plate of the cleaning module, which is brought contact with the floor surface, is convex so as to be controlled. Accordingly, the robot cleaner according to the present invention has an advantage of efficiently wiping the floor surface by changing the angle of the tilting plate depending on the traveling direction of the robot cleaner.

Third, since the cleaning module, which is rotated by the module drive unit, is detachably mounted on the main body, the robot cleaner according to the present invention has an advantage of making it convenient for a user to attach and detach the cleaning module.

Fourth, the robot cleaner according to the present invention employs the spin-mop assembly capable of performing a wet-type mopping operation so as to perform a wet-type mopping operation on the floor surface using the spin-mop assembly while wiping away moisture from the floor surface using the cleaning module. Accordingly, the robot cleaner according to the present invention has an advantage of being capable of concurrently performing a wet-type mopping operation and a dry-type mopping operation during a single traveling motion.

BEST MODE

Advantages and features of the present invention, and the method for achieving them will be apparent from embodiments which are described in detail with reference to the accompanying drawings. However, the present invention is not limited to the embodiments set forth herein and may be embodied in many different forms. Rather, these embodiments are provided so that the disclosure of the present invention will be thorough and complete, and will fully convey the scope of the disclosure to those skilled in the art. The present invention is defined only by the categories of the claims. The same reference numbers will be used throughout this specification to refer to the same components.

Hereinafter, a movable robot according to an embodiment of the present invention will be described with reference to the drawings.

Figure 1:
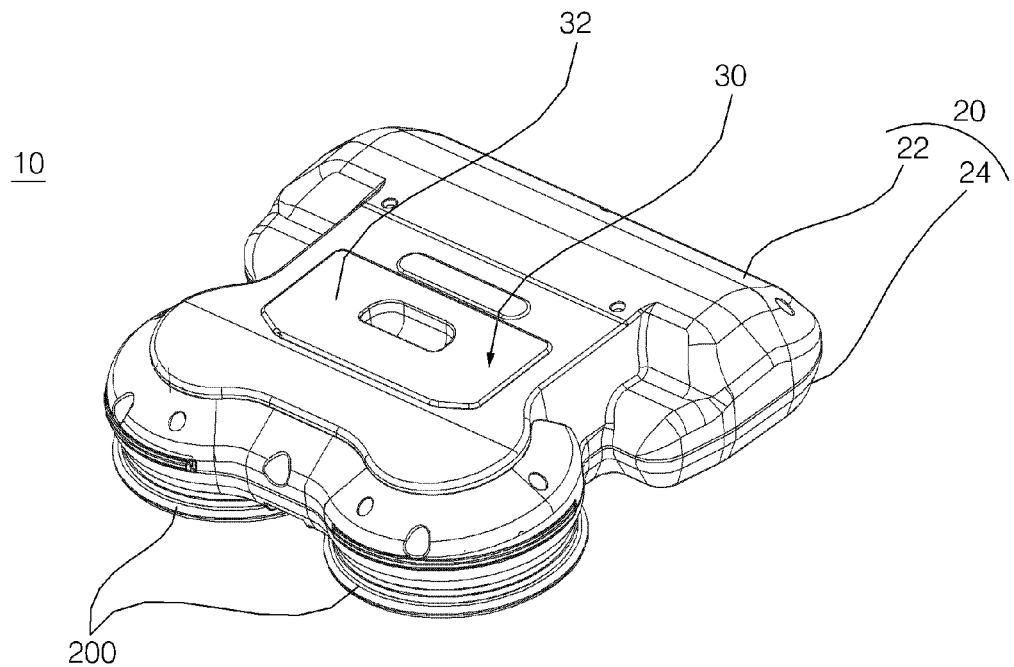
FIG. 1 is a perspective view of a robot cleaner according to an embodiment of the present invention.
Figure 2:
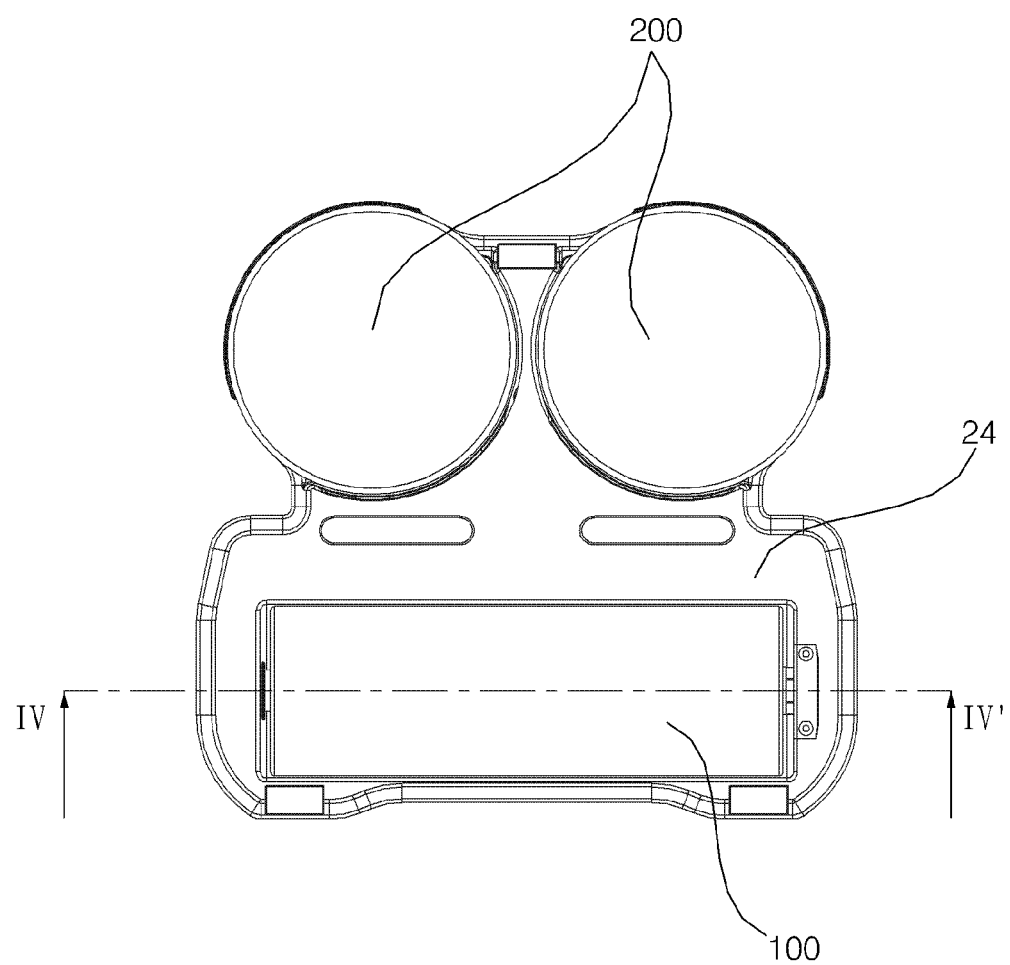
FIG. 2 is a bottom view of the robot cleaner according to the embodiment of the present invention.
Figure 3:
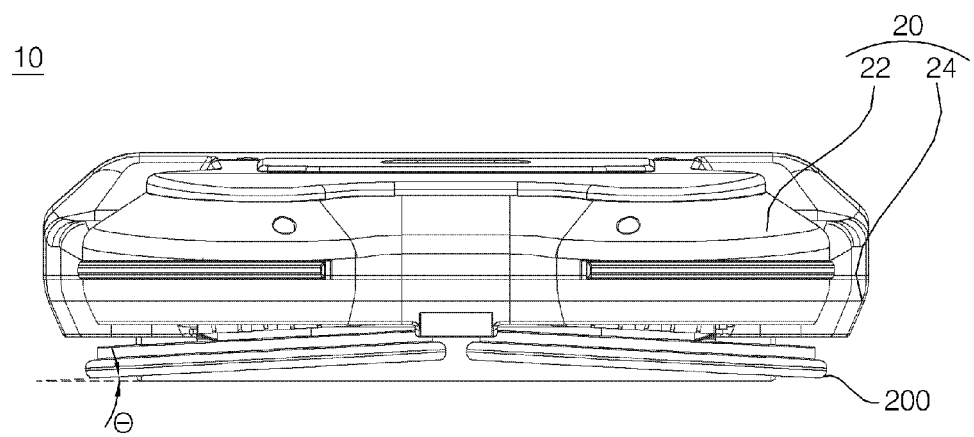
FIG. 3 is a front view of the robot cleaner according to the embodiment of the present invention.
Figure 4:
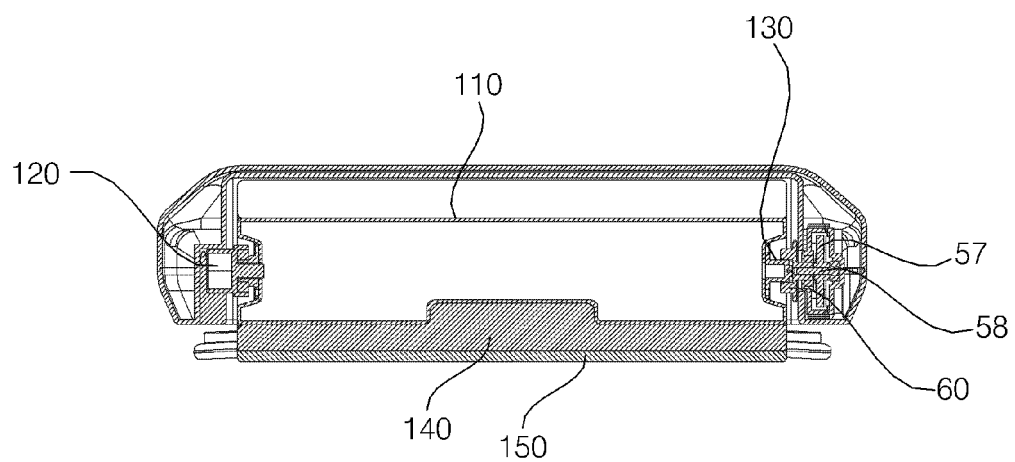
FIG. 4 is a partially enlarged cross-sectional view taken along line II-II in FIG. 2.
Figure 5:
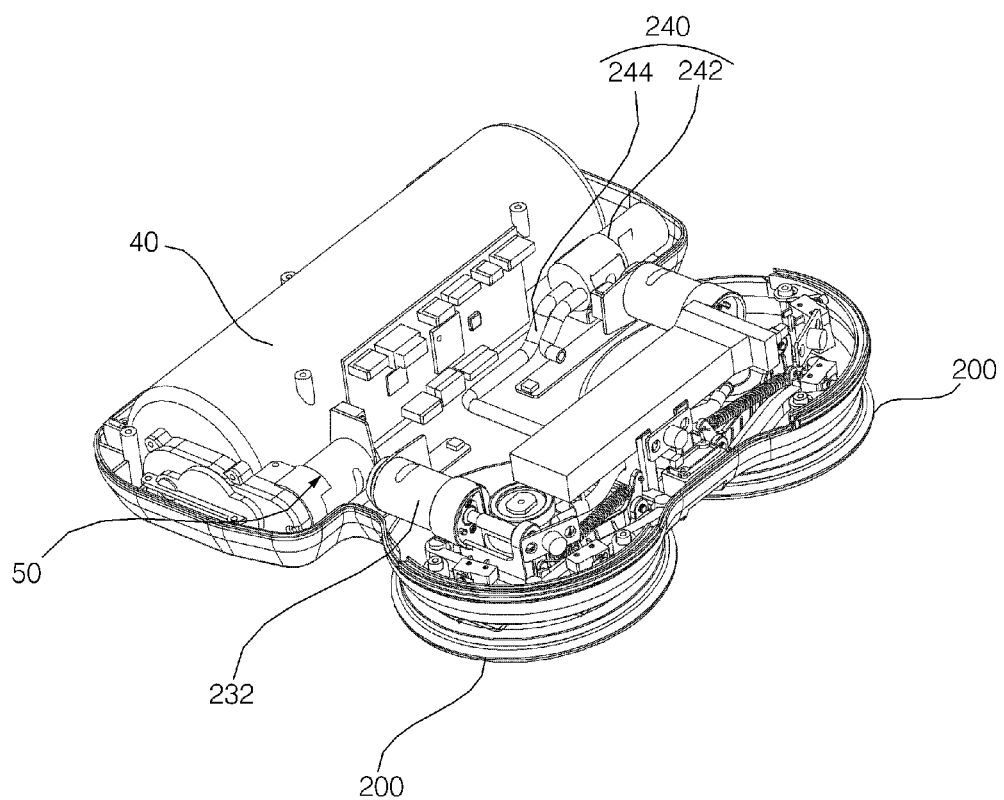
FIG. 5 is a perspective view of the robot cleaner according to the embodiment of the present invention, from which an upper cover is removed.

FIG. 1 is a perspective view of the robot cleaner according to an embodiment of the present invention. FIG. 2 is a bottom view of the robot cleaner according to the embodiment of the present invention. FIG. 3 is a front view of the robot cleaner according to the embodiment of the present invention. FIG. 4 is a partially enlarged cross-sectional view taken along line IV-IV in FIG. 2. FIG. 5 is a perspective view of the robot cleaner according to the embodiment of the present invention, from which an upper cover is removed.

Hereinafter, the overall construction of the robot cleaner according to the embodiment will be described with reference to FIGS. 1 to 7.

The robot cleaner 10 according to the embodiment includes a main body 20 defining the appearance thereof, a moving unit for moving the main body, a cleaning module 100 configured to be brought into contact at at least part of the lower surface thereof with a floor surface, and a module drive unit 60 configured to control an angle of inclination defined between the lower surface of the cleaning module and the floor surface.

The main body 20 of the movable robot according to the embodiment may further include therein a drive motor for driving the movable unit and a controller (not shown) for controlling the movable unit. In addition, the main body 20 may further include therein a storage unit for storing water therein and a flow channel and pump for supplying water according to the functions of the robot cleaner. The main body 20 may be composed of an upper cover for covering an upper part thereof so as to protect internal components, and a base connected to a spin-mop assembly 200 or a bumper 100, which are components of the movable unit.

The movable unit of the robot cleaner, which is a unit for enabling the main body 20 to travel, may include a wheel, a rolling mop or a spin mop. In the embodiment, the movable unit will be described as being the spin-mop assembly 200 adapted to perform a mopping operation while rotating in the state of being in contact with the floor surface. However, this is merely one embodiment, and the present invention may also be applied to a robot cleaner provided with wheels as the movable unit, without being limited to the one embodiment. The movable unit according to the embodiment includes the spin-mop assembly 200, which is a mop pad disposed at a lower side thereof so as to perform a mopping operation while rotating in the state of being in contact with the floor surface, and a drive assembly 230 for rotating the spin-mop assembly 200.

Referring to FIG. 3, in the robot cleaner 10 according to the embodiment, the spin-mop assembly 200 is disposed so as to be inclined with respect to the floor surface by a predetermined angle θ. In order to allow smooth movement of the robot cleaner 10, the spin-mop assembly 200 is disposed so as to be inclined by the predetermined angle θ such that the spin-mop assembly 200 is brought into contact with the floor surface mainly at a certain partial surface thereof rather than the entire surface thereof. The spin-mop assembly 200 according to the embodiment is able to also perform wet-type mopping on the floor by supplying water from a water tank (not shown), which is additionally provided.

The robot cleaner 10 may include a plurality of spin-mop assemblies 200. The spin-mop assemblies 200 are disposed at a lower side of the main body 20. The spin-mop assembly 200 is able to move the main body 20 or to perform a mopping operation on the floor by virtue of rotation thereof.

The main body 20 may be provided therein with a storage container 30, for storing water to be supplied to the spin-mop assembly 200, and a storage container cover 32, for opening and closing an upper side of the storage container 30.

Water may be used as the liquid stored in the storage container. However, this is merely one embodiment, and cleaning liquid may also be used as the stored liquid. Cleaning liquid refers to liquid in which water and a cleaning agent are mixed with each other so as to remove contaminants adhering to the floor. The cleaning agent is intended to remove contaminants by means of the chemical action thereof, and the cleaning agent, which is used together with water, may be a powder-type cleaning agent or a liquid-type cleaning agent.

The robot cleaner 10 includes a supply assembly 240 for supplying stored liquid to the spin-mop assembly 200. The supply assembly 240 supplies stored liquid to the mop pad of the spin-mop assembly 200.

The supply assembly 240 includes the storage container 30 for storing stored liquid to be supplied to the spin-mop assembly 200, and defines a flow channel through which the stored liquid flows between the storage container 30 and the spin-mop assembly 200. The supply assembly according to the embodiment may further include a pump 242 for supplying liquid stored in the storage container 30 to the spin-mop assembly 200, and a hose 244 defining a flow channel through which stored liquid flows between the storage container 30 and the spin-mop assembly 200. The supply assembly 240 may further include a valve 156, which is provided on the hose 244 so as to control flow of the stored liquid. The controller of the robot cleaner 10 according to the embodiment may control the pump adapted to supply the liquid stored in the storage container 30 to the spin-mop assembly 200. In other words, the controller controls the pump 242 so as to control the amount of stored liquid supplied to the spin-mop assembly 200.

The hose 244 according to the embodiment is connected to a nozzle of the spin-mop assembly 200. The hose 244 supplies the stored liquid to a water collection guide of the spin-mop assembly 200.

The storage container 30 may be provided therein with a sterilization module (not shown) for sterilizing the stored liquid stored therein. The sterilization module functions to sterilize the liquid stored in the storage container.

Figure 6:
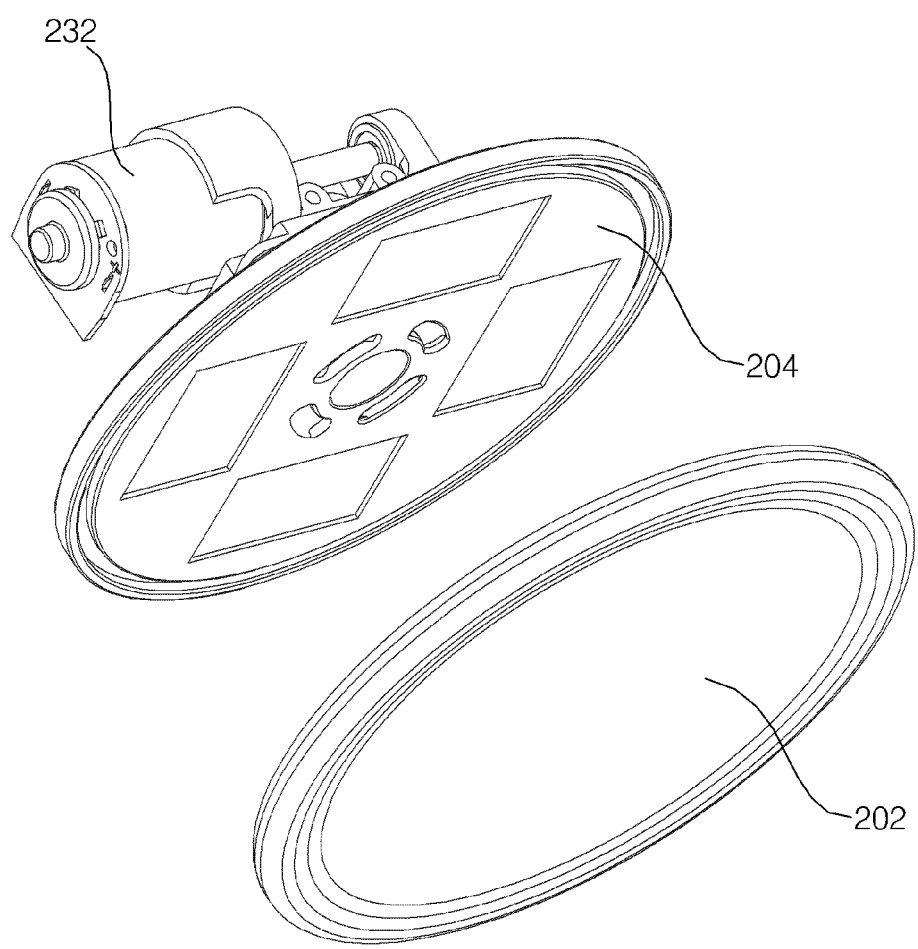
FIG. 6 is a view explaining a rotating plate and a mop pad of the spin-mop assembly of the robot cleaner according to the embodiment of the present invention.
Figure 7:
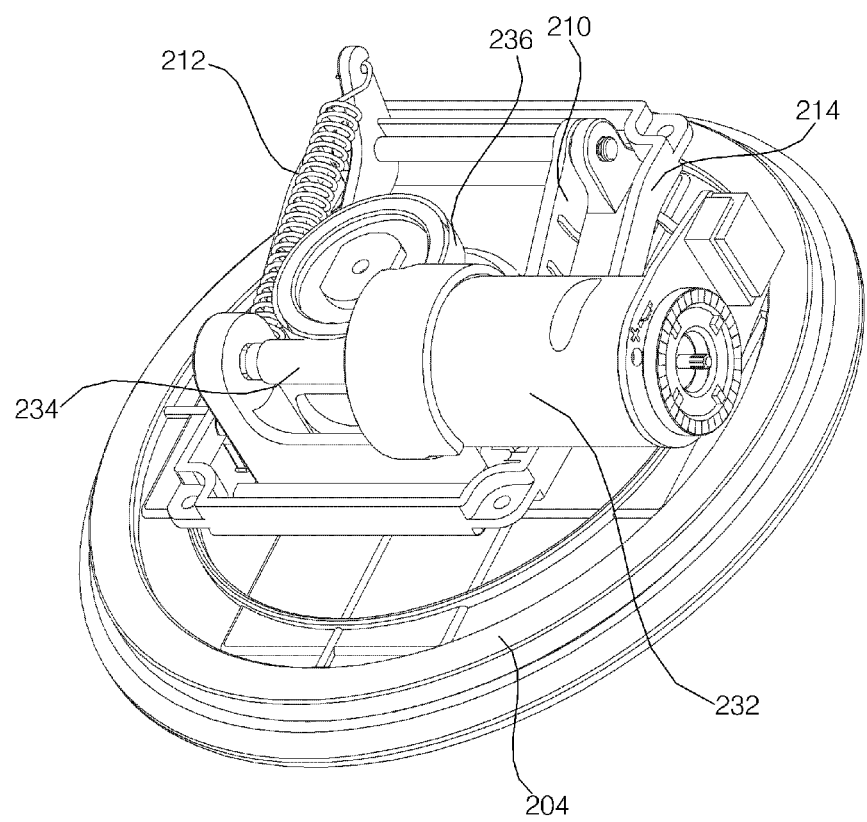
FIG. 7 is a perspective view illustrating the spin-mop assembly and the drive assembly of the robot cleaner according to the embodiment of the present invention.
Figure 8:
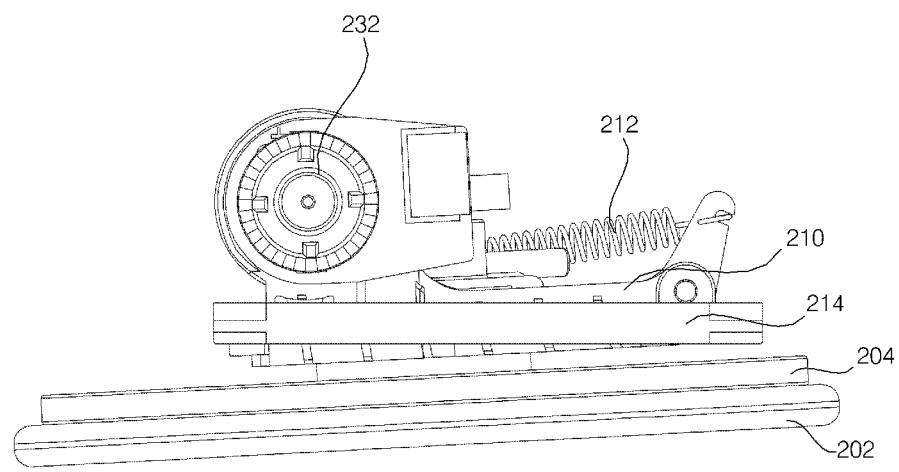
FIG. 8 is a side view of the spin-mop assembly and the drive assembly of the robot cleaner shown in FIG. 7.
Figure 9:
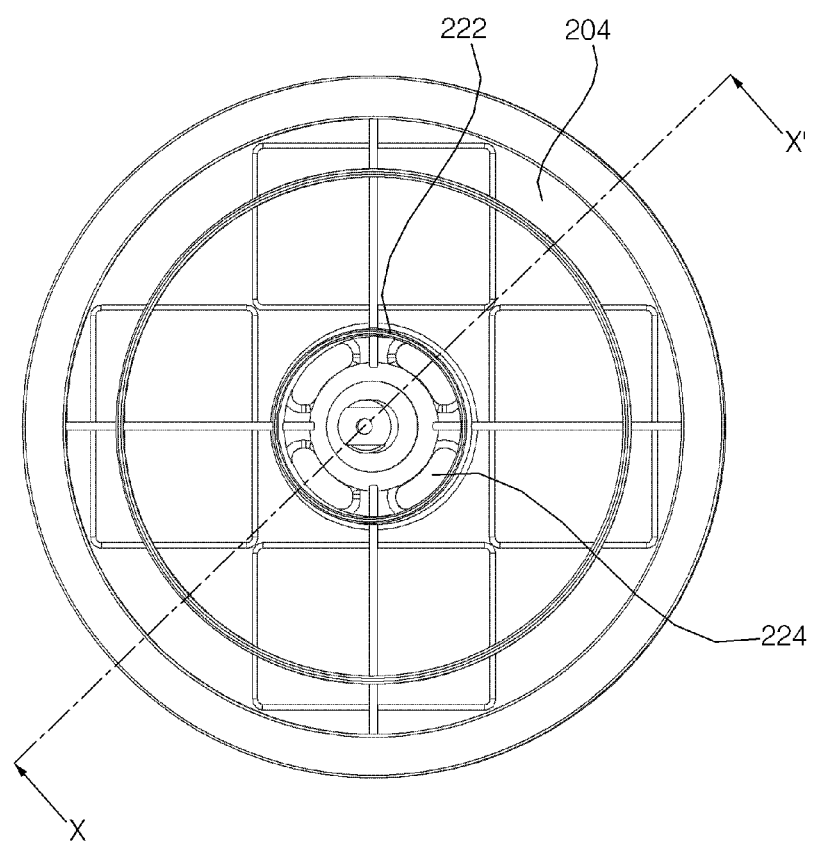
FIG. 9 is a view explaining the rotating plate and the water collection guide of the spin-mop assembly according to the embodiment of the present invention.
Figure 10:
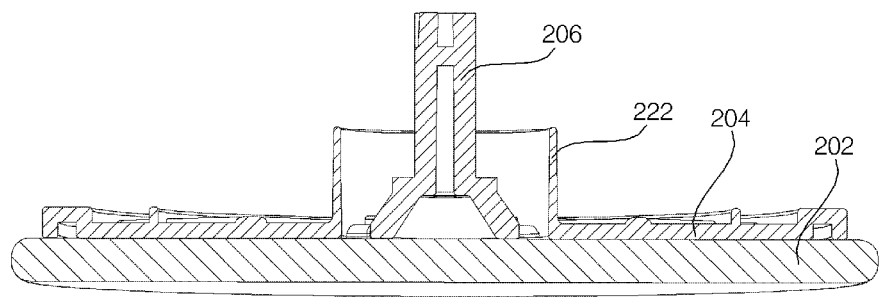
FIG. 10 is a cross-sectional view taken along line X-X in FIG. 9.
Figure 11:
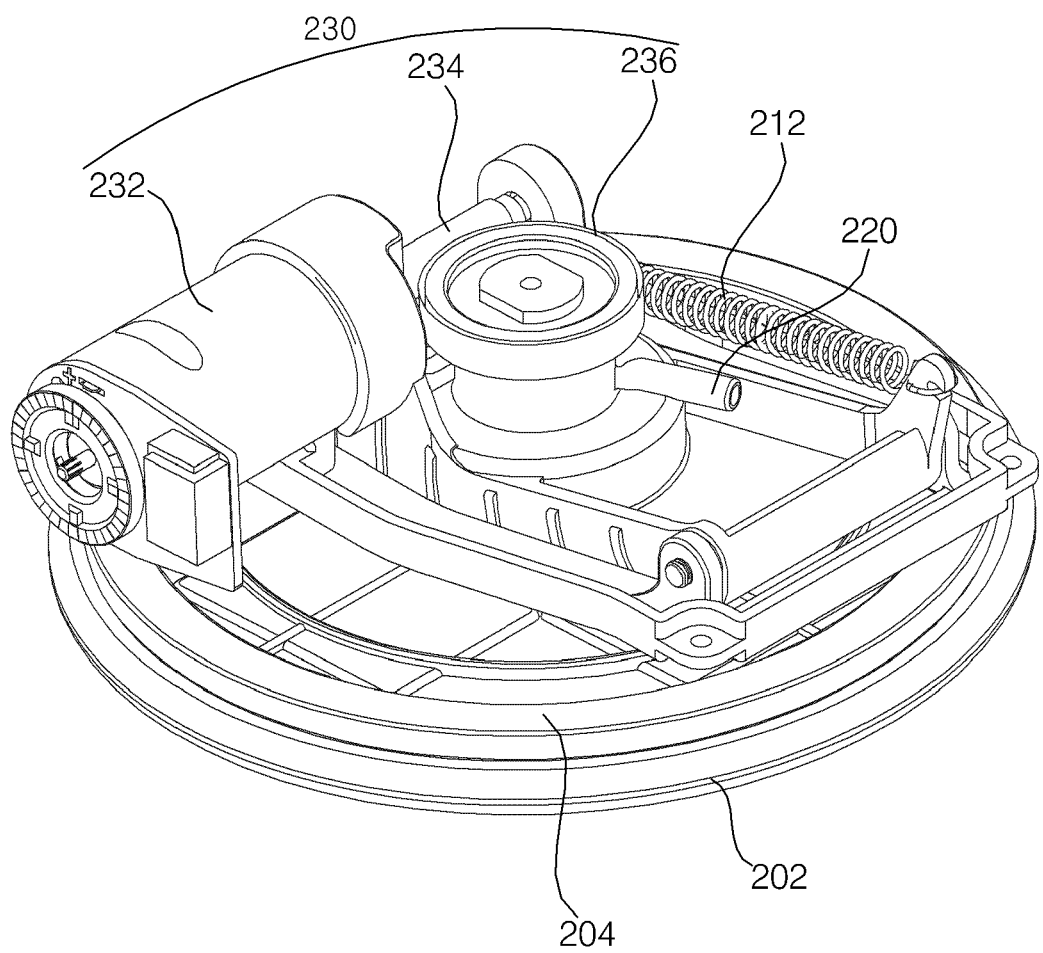
FIG. 11 is a perspective view of the spin-mop assembly and the drive assembly of the robot cleaner of FIG. 7, which is viewed in another direction.

FIG. 6 is a view explaining a rotating plate and a mop pad of the spin-mop assembly of the robot cleaner according to the embodiment of the present invention. FIG. 7 is a perspective view illustrating the spin-mop assembly and the drive assembly of the robot cleaner according to the embodiment of the present invention. FIG. 8 is a side view of the spin-mop assembly and the drive assembly of the robot cleaner shown in FIG. 7. FIG. 9 is a view explaining the rotating plate and the water collection guide of the spin-mop assembly according to the embodiment of the present invention. FIG. 10 is a cross-sectional view taken along line X-X in FIG. 9. FIG. 11 is a perspective view of the spin-mop assembly and the drive assembly of the robot cleaner of FIG. 7, which is viewed in another direction.

Hereinafter, the construction of the spin-mop assembly will be described with reference to FIGS. 6 to 11. Since the plurality of spin-mop assemblies according to the embodiment have the same construction, the spin-mop assemblies are denoted by the same reference numeral in FIGS. 6 to 11. This may be applied to each of the plurality of spin-mop assemblies.

The spin-mop assembly 200 includes the rotating plate 204, connected to the drive assembly 230 so as to be rotated, and a mop pad 202 attached to a lower side of the rotating plate 204. The rotating plate 240 may be provided with an attachment unit capable of allowing the mop pad 202 to be attached to and detached from the rotating plate 204. The attachment unit may be embodied as a Velcro fastener.

Referring to FIG. 8, the spin-mop assembly 200 may be configured to be inclined with respect to the bottom surface of the spin-mop assembly 200 by a predetermined angle. The spin-mop assembly 200 includes a suspension base 210, connected to the rotating plate 240 so as to control the inclination of the rotating plate 204, and an elastic member 212 adapted to apply an elastic force to one side of the suspension base 210 so as to control the slope of the rotating plate 204. The suspension base 210 is hingedly coupled to a suspension frame 214 secured to the base 24 of the main body 20. The elastic member 212 is secured at one end thereof to the suspension frame 214 so as to apply an elastic force to the suspension base 210 connected to the other end of the elastic member 212. Unless an additional external force is applied to the spin-mop assembly 200, the rotating plate 204 of the spin-mop assembly is inclined with respect to the floor surface by a predetermined angle by virtue of the elastic force of the elastic member 212, as illustrated in FIG. 8.

Referring to FIG. 3, by virtue of the elastic member 212 and the suspension base 210, each of the spin-mop assemblies 100, which are disposed at right and left sides of the base, is inclined with respect to the floor surface, and the spin-mop assemblies 100 are disposed so as to be symmetrical with each other.

The spin-mop assembly 200 includes a nozzle 220, connected to the hose 244, which is in turn connected to the storage container 30, and a water collection guide 222 for collecting the stored liquid supplied from the nozzle 220. The rotating plate 204 is provided with rotating plate holes 224, which allow the stored liquid collected in the water collection guide 222 to be supplied to the mop pad 202.

The nozzle, which is provided in the spin-mop assembly 200, is connected to the hose 244 so as to receive the liquid stored in the storage container 30.

The drive assembly 230 serves to rotate the rotating plate 204 of the spin-mop assembly 200. According to the embodiment, one drive assembly 230 is provided at each of the spin-mop assemblies 200.

Hereinafter, the drive assembly 230 disposed at the spin-mop assembly 200 will be described with reference to FIG. 11.

The drive assembly 230 include a drive motor 232 for supplying the drive force required to rotate the spin mop, a first drive gear 234 formed on the rotating shaft 206 of the drive motor 232, and a second drive gear 236 engaging with the first drive gear 234 so as to transmit rotational force to the rotating plate 204.

The first drive gear 234 according to the embodiment may be embodied as a worm gear adapted to transmit rotational force to the second drive gear 236, which is vertically disposed. The second drive gear 236 may be embodied as a gear, which engages with the worm gear so as to receive the rotational force.

The rotating plate 204 is provided on the upper surface thereof with a rotating shaft 206, which projects upwards from the center of the upper surface. The upper end of the rotating shaft 206 is connected to the second drive gear 236. The drive assembly 230 is disposed above the suspension base 210. Accordingly, even when the angle of inclination of the rotating plate 204 varies, it is possible to drive the rotating plate 204 in a steady manner.

Figure 12:
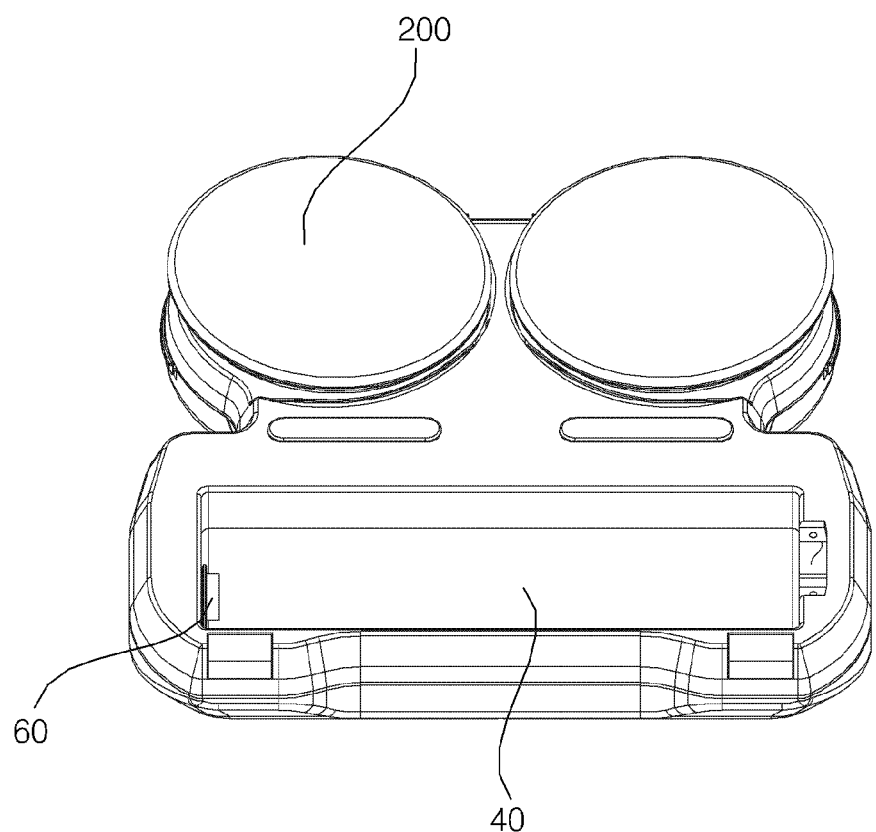
FIG. 12 is a view illustrating the robot cleaner according to the embodiment of the present invention, from which the cleaning module and a coupler are removed.
Figure 13:
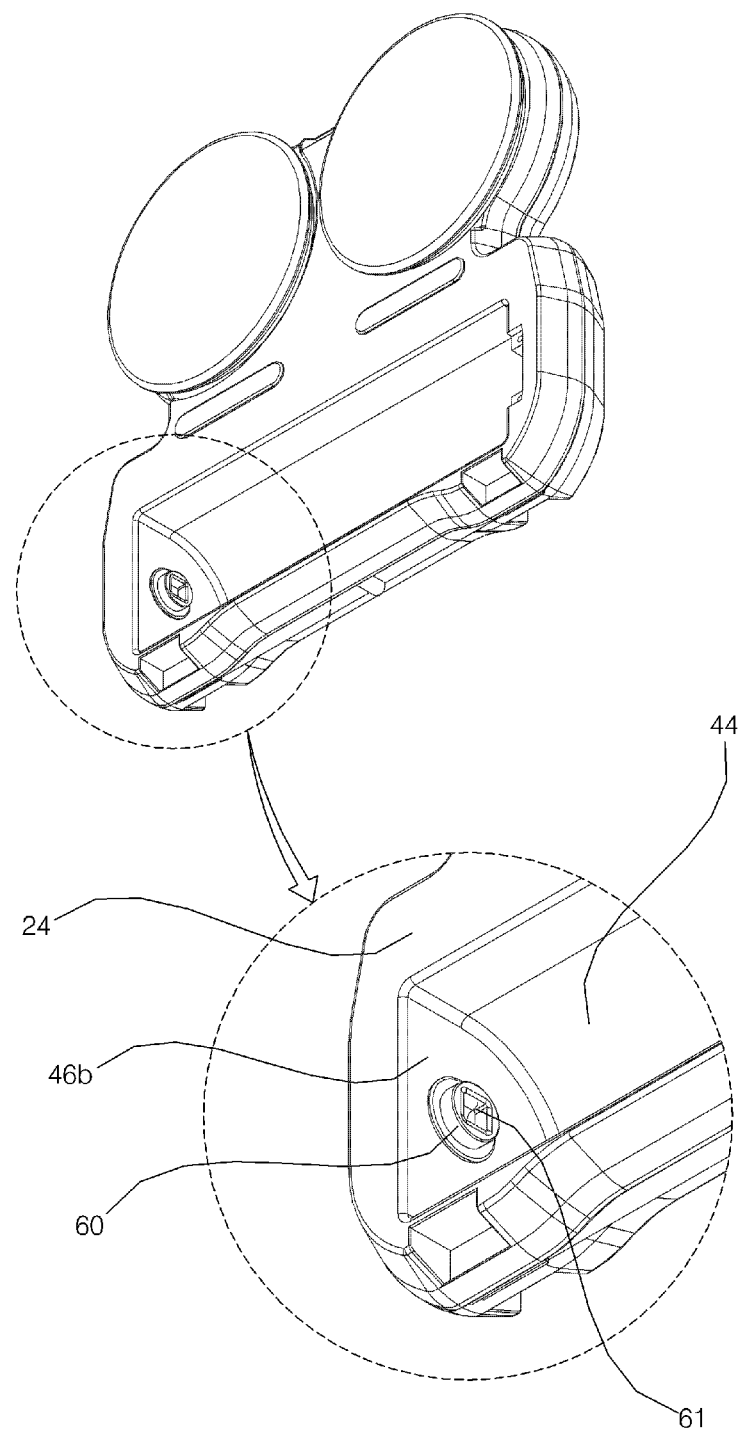
FIG. 13 is a partially enlarged perspective view illustrating a portion of a module housing of FIG. 12.
Figure 14:
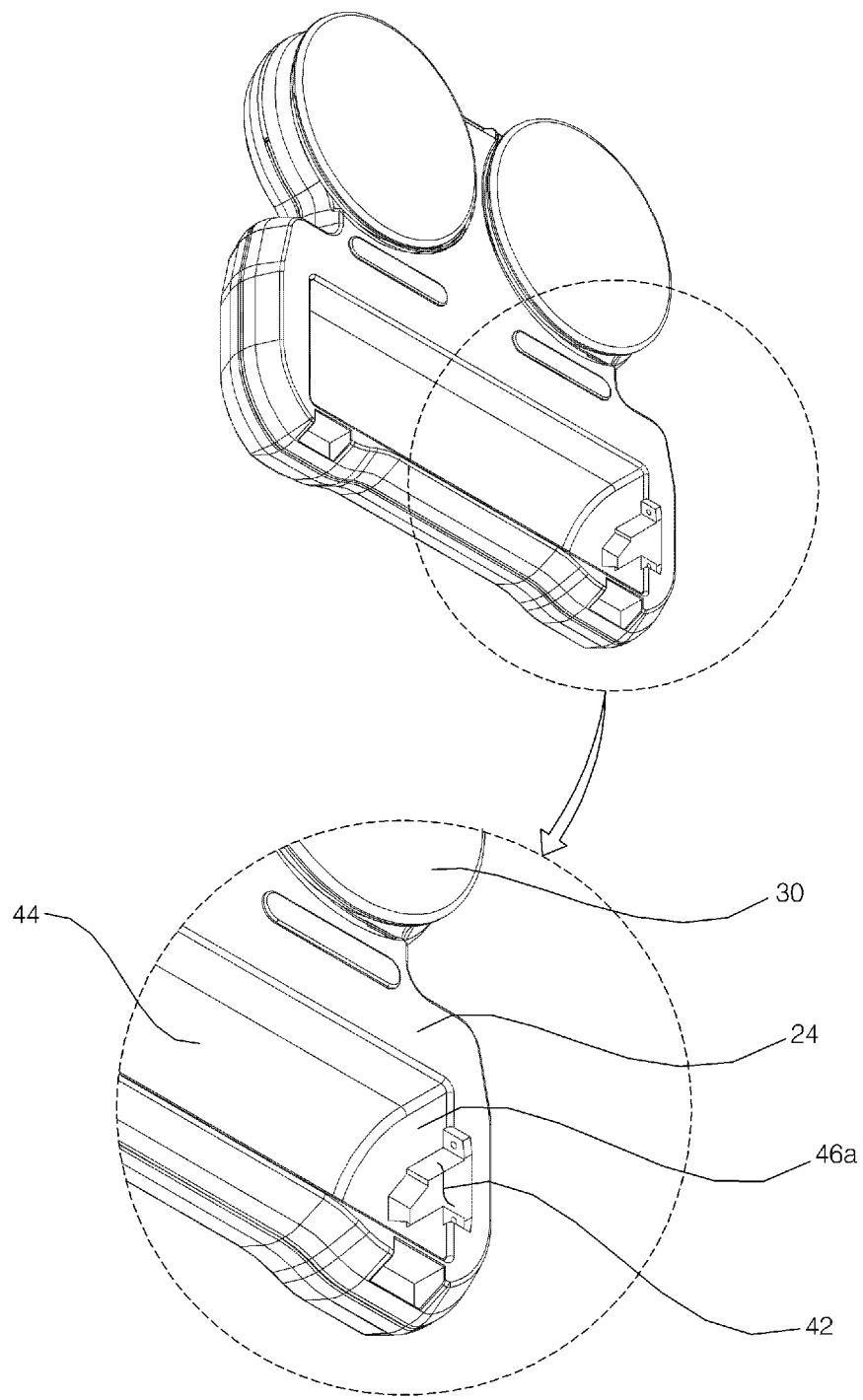
FIG. 14 is a partially enlarged perspective view illustrating the opposite portion of the module housing of FIG. 12.

FIG. 12 is a view illustrating the robot cleaner according to the embodiment of the present invention, from which the cleaning module and a coupler are removed. FIG. 13 is a partially enlarged perspective view illustrating a portion of a module housing of FIG. 12. FIG. 14 is a partially enlarged perspective view illustrating the opposite portion of the module housing of FIG. 12.

Hereinafter, the module housing according to the embodiment, in which the cleaning module of the robot cleaner is received, will be described.

The main body 20 of the robot cleaner 10 according to the embodiment defines the module housing 40 for receiving therein the cleaning module 100, which is brought into contact with the floor. The module housing 40 defines a space for receiving part of the cleaning module 100 and is open downwards. The module housing 40 is provided at one side thereof with a rotational-protrusion-connecting member 60 adapted to change an angle of the cleaning module 100, and is provided at the opposite side thereof with a holding-protrusion-fitting groove 42 adapted to maintain the disposition of the cleaning module 100.

The module housing 40 is formed by depressing a portion of the base 24 of the main body 20 inward. The module housing 40 defines a space in which a rotational member 110 of the cleaning module 100 rotates. The module housing 40 is divided into a peripheral surface 44, which is formed so as to correspond to the peripheral surface of the cleaning module 100 having an approximate cylindrical shape, and a pair of lateral side surfaces 36, which are formed at the rotational axis of the cleaning module.

One 46a of the pair of lateral side surfaces, which define the module housing 40, is provided with the holding-protrusion-fitting groove 42 into which a holding protrusion 120 of the cleaning module is fitted. The holding-protrusion-fitting groove 42 defines a space in which the holding protrusion 120 of the cleaning module 100 is disposed. The holding-protrusion-fitting groove 42 is open downwards so as to allow the holding protrusion 120 of the cleaning module 100 to be fitted thereinto or taken out thereof. The holding-protrusion-fitting groove 42 has a shape corresponding to the outer peripheral surface of the holding protrusion 120. The holding-protrusion-fitting groove 42 according to the embodiment has a shape corresponding to an upper portion of the holding protrusion 120 having a polygonal column shape. The holding-protrusion-fitting groove 42 defines a space to receive the coupler 70, which will be described later. The holding-protrusion-fitting groove 42 holds both the coupler 70 and the holding protrusion 120 of the cleaning module 100. The combination of the holding-protrusion-fitting groove 42 with the coupler 70 defines a polygonal hole corresponding to the outer shape of the holding protrusion 120.

The other 46b of the pair of lateral side surfaces, which define the module housing 40, is provided with a rotational-protrusion-connecting member 60, which is connected to a rotational protrusion 130 of the cleaning module 100. The rotational-protrusion-connecting member 60 is connected to a module drive motor 52, which will be described later, so as to allow an angle of inclination defined between the cleaning module 100 and the floor surface to be varied. The rotational-protrusion-connecting member 60 has a shape corresponding to the outer peripheral shape of the rotational protrusion 130. The rotational-protrusion-connecting member 60 is provided with a recess 61 capable of receiving the rotational protrusion 130. The rotational-protrusion-connecting member 60 is coupled to the rotational protrusion 130 in such a manner that the rotational protrusion 130 is fitted into the rotational-protrusion-connecting member 60. The recess 61 formed in the rotational-protrusion-connecting member 60 has a shape corresponding to the polygonal shape of the rotational protrusion.

Figure 15:
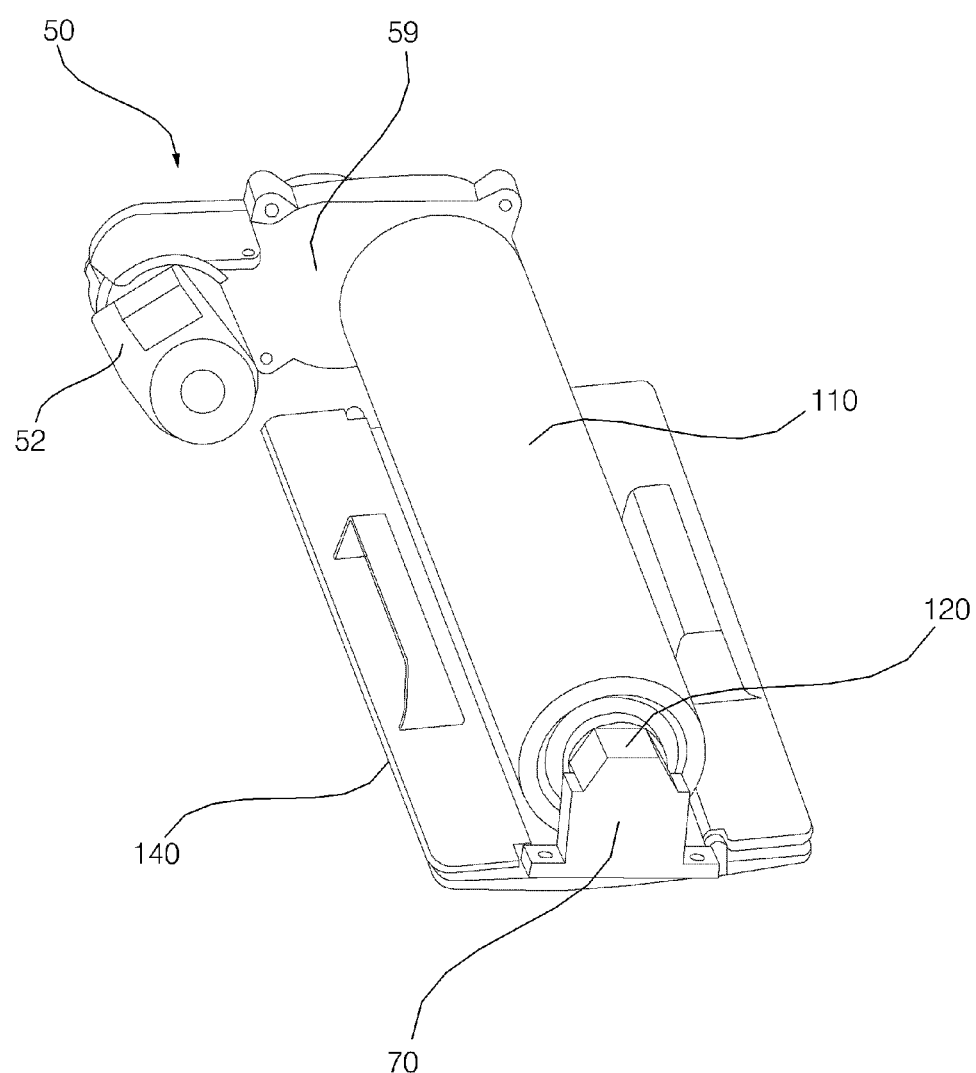
FIG. 15 is a view illustrating the coupled state of the cleaning module, the module drive unit and the coupler according to the embodiment of the present invention.
Figure 16:
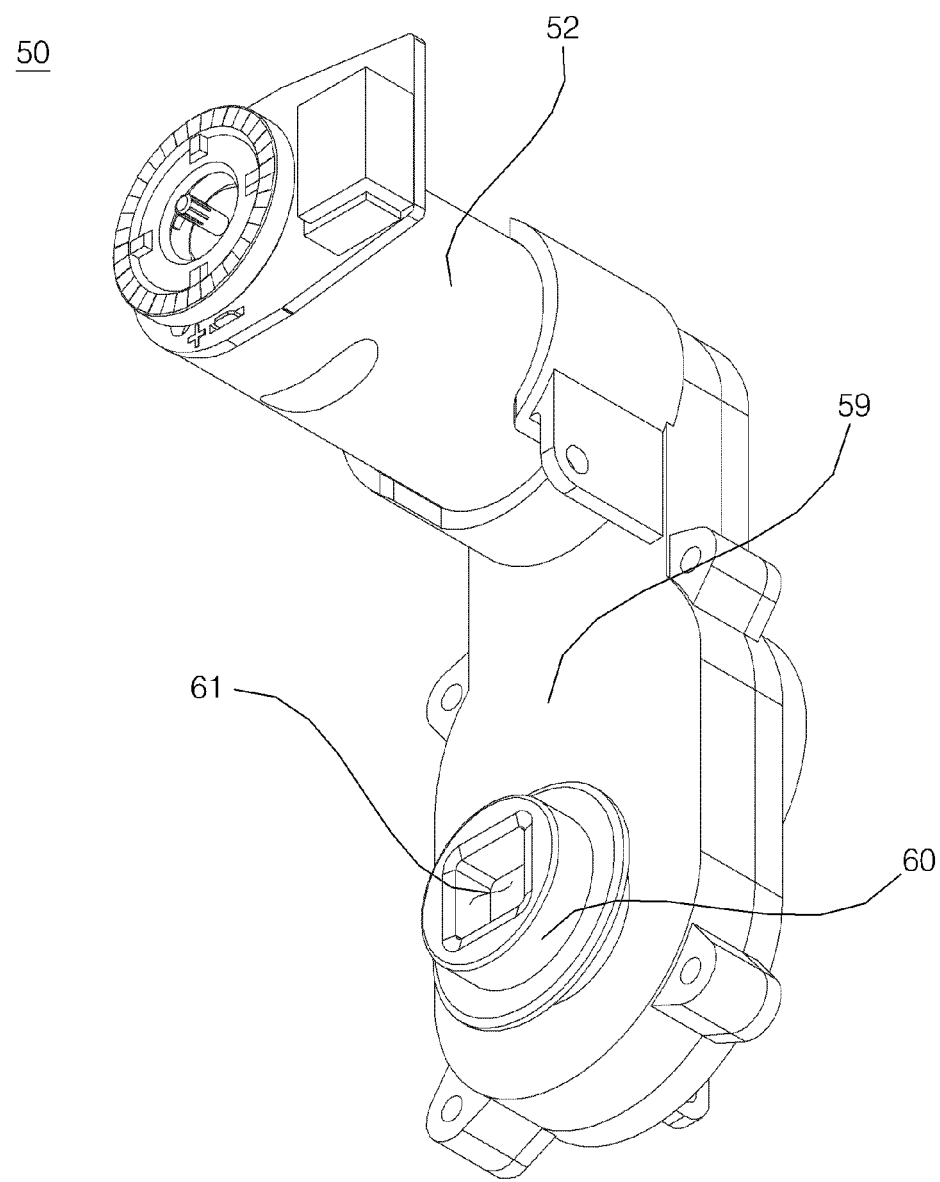
FIG. 16 is a perspective view of the module drive unit according to the embodiment of the present invention.
Figure 17:
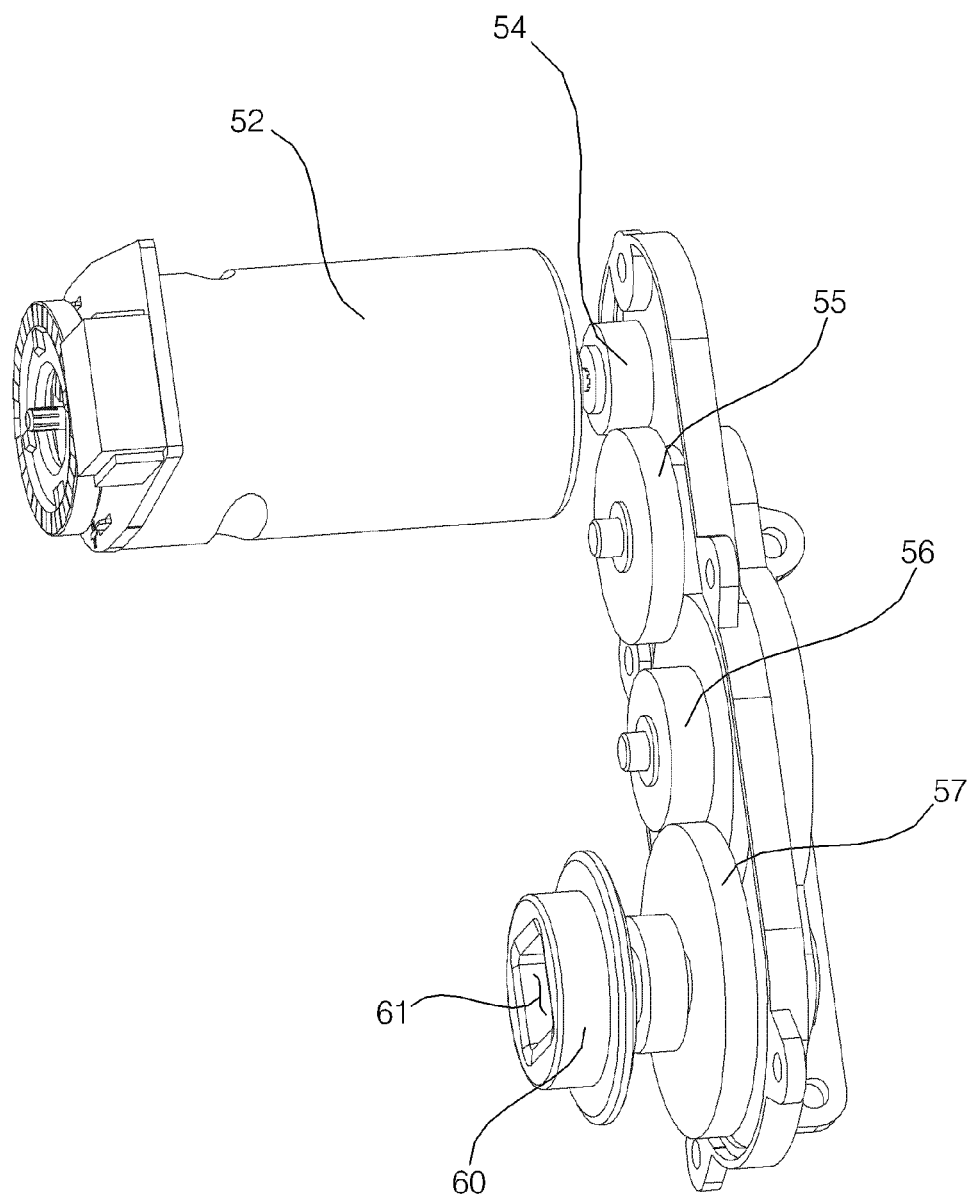
FIG. 17 is a perspective view of the module drive unit according to the embodiment of the present invention, from which a gear cabinet is removed.
Figure 18:
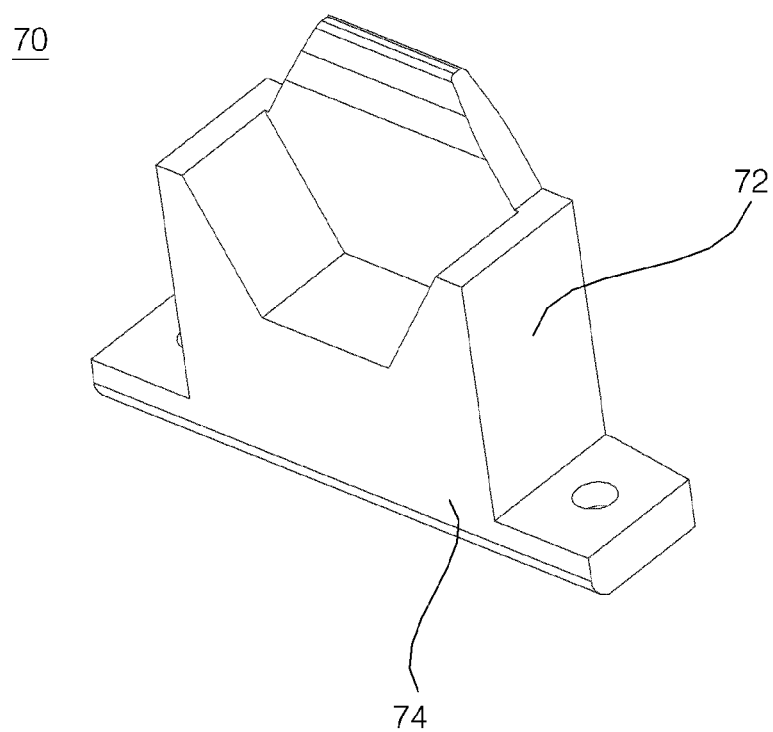
FIG. 18 is a perspective view of the coupler according to the embodiment of the present invention.

FIG. 15 is a view illustrating the coupled state of the cleaning module, the module drive unit and the coupler according to the embodiment of the present invention. FIG. 16 is a perspective view of the module drive unit according to the embodiment of the present invention. FIG. 17 is a perspective view of the module drive unit according to the embodiment of the present invention, from which a gear cabinet is removed. FIG. 18 is a perspective view of the coupler according to the embodiment of the present invention.

Hereinafter, the module drive unit and the coupler according to the embodiment of the present invention will be described with reference to FIGS. 15 to 18.

The module drive unit 50 varies the angle of the cleaning module mounted inside the module housing by virtue of activation of the module drive motor 52. The module drive unit 50 includes the module drive motor 52, which is activated by means of an external power source, the rotational-protrusion-connecting member 60 adapted to rotate the cleaning module 100 by virtue of rotation of the module drive motor, and at least one gear for transmitting a rotational force from the module drive motor to the rotational-protrusion-connecting member 60.

The module drive unit 50 according to the embodiment includes a plurality of gears 54, 55, 56 and 57 for transmitting a rotational force from the module drive motor to the rotational-protrusion-connecting member 60. Referring to FIG. 10, the module drive unit 50 according to the embodiment includes a first gear 54 coupled to the rotating shaft of the module drive motor, a second gear 55 engaging with the first gear 54 so as to be rotated, a third gear 56 engaging with the second gear 55 so as to be rotated, and a fourth gear 57 engaging with the third gear so as to rotate the rotational-protrusion-connecting member 60 in linkage with the third gear. Each of the plurality of gears according to the embodiment may be embodied as a spur gear, which is provided on the outer peripheral surface thereof with teeth. The number and shape of the gears are selected merely according to one embodiment, and may thus be variously modified as long as they are able to transmit a rotational force from the module drive motor 52 to the rotational protrusion 130. The rotating shaft 58 of the fourth gear 57 according to the embodiment is connected to the rotational-protrusion-connecting member 60. Consequently, when the fourth gear 57 is rotated, the rotational-protrusion-connecting member 60 is also rotated therewith.

The rotational-protrusion-connecting member 60 according to the embodiment is connected to the rotating shaft 58 of the fourth gear 57, and is thus rotated with the fourth gear 57. The rotational-protrusion-connecting member defines the recess 61, which receives the rotational protrusion 130 of the cleaning module and will be described later. The recess 61 formed in the rotational-protrusion-connecting member 60 has a shape corresponding to the outer peripheral shape of the rotational protrusion 130.

The module drive unit 50 according to the embodiment includes a gear cabinet 59 surrounding the plurality of gears 54, 55, 56 and 57. The plurality of gears 54, 55, 56 and 57 are disposed inside the gear cabinet 59. The rotational-protrusion-connecting member is disposed outside the gear cabinet 59, and a plurality of bearings are disposed between the gear cabinet 59 and the rotational-protrusion-connecting member 60 for the purpose of smooth rotation of the rotational-protrusion-connecting member 60.

The robot cleaner 10 according to the embodiment further includes the coupler 70, which is fitted into the holding-protrusion-fitting groove 42 so as to hold the holding protrusion 120. The coupler 70 is brought into contact with the lower portion and the end surface of the holding protrusion 120. The coupler holds the holding protrusion 120 in cooperation with the holding-protrusion-fitting groove 42.

The coupler 70 includes a holding-protrusion-coupling portion 72, which is disposed so as to be brought into contact with the lower portion of the holding protrusion 120, and a fitting-groove-coupling portion 74, which is fitted into the holding-protrusion-fitting groove. The fitting-groove-coupling portion 74 may be coupled to the holding-protrusion-fitting groove 42 by means of fastening elements such as bolts or the like.

The holding-protrusion-coupling portion 72 has a shape corresponding to a lower portion of the outer peripheral shape of the holding protrusion 120. Upon coupling of the holding-protrusion-fitting groove 42 with the coupler, they define therebetween a recess into which the holding protrusion 120 having a hexagonal column shape is inserted.

Figure 19:
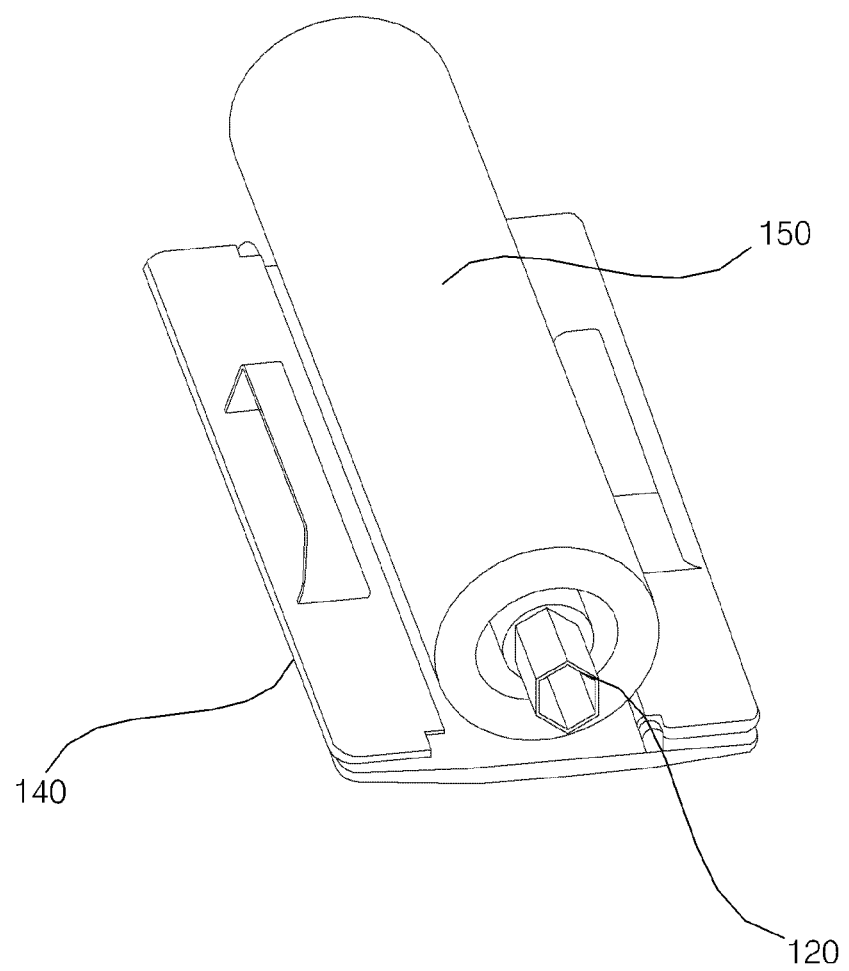
FIG. 19 is a perspective view of the cleaning module according to the embodiment of the present invention.
Figure 20:
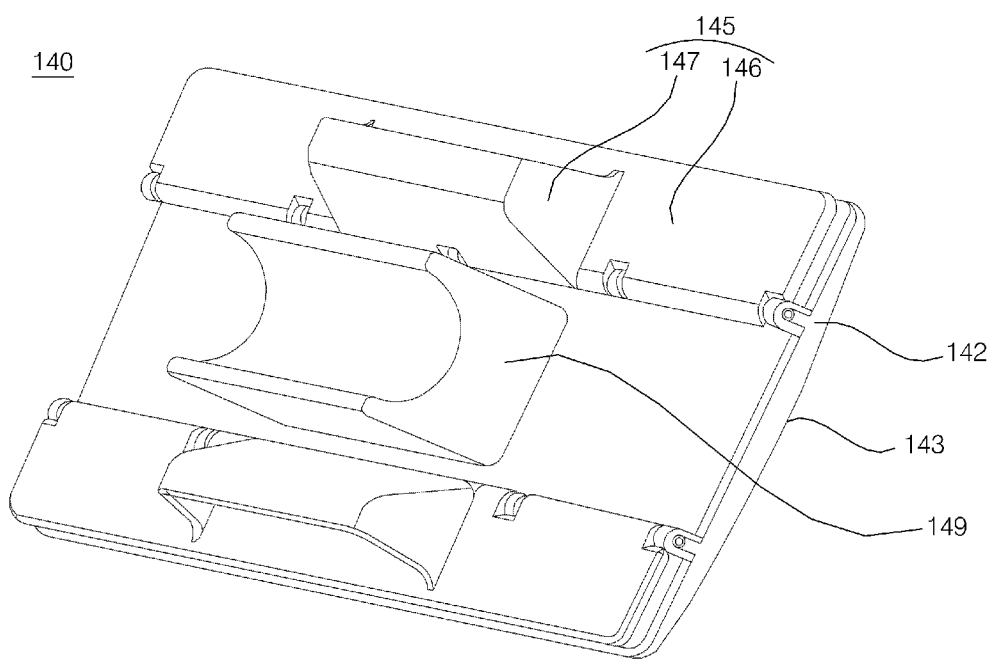
FIG. 20 is a view of a mop-tilting member of the cleaning module according to the embodiment of the present invention.
Figure 21:
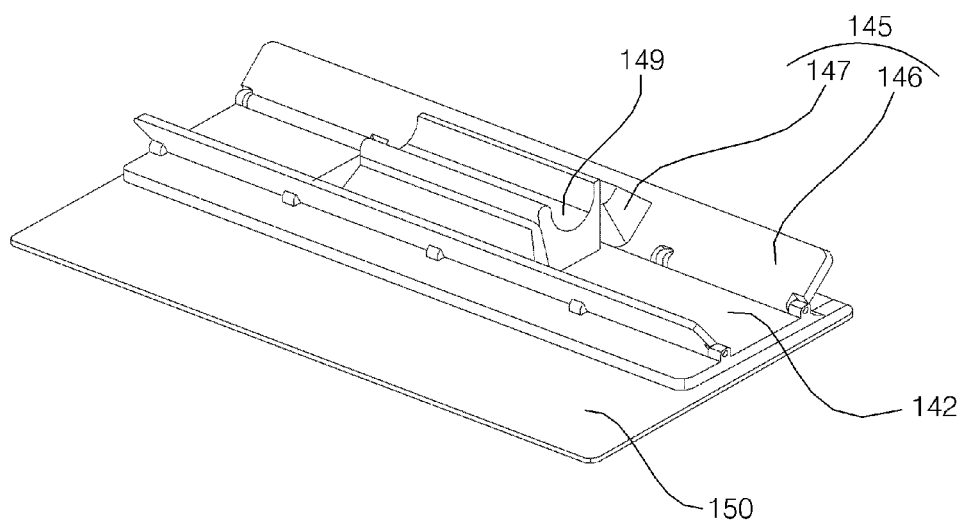
FIG. 21 is a view explaining a process of mounting a mop to the mop-tilting member of the cleaning module according to the embodiment of the present invention.
Figure 22:
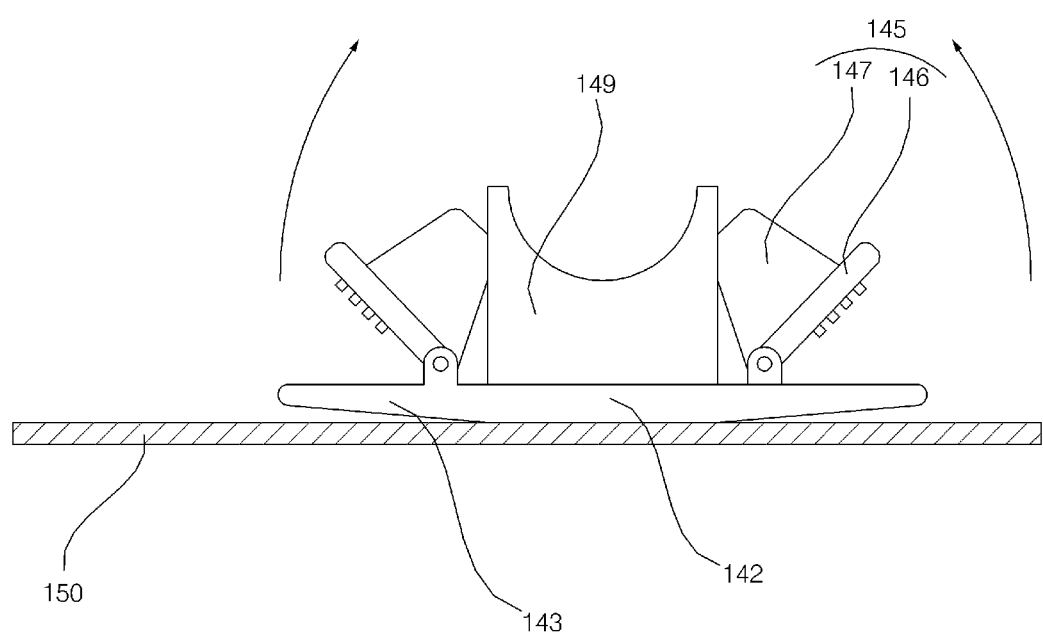
FIG. 22 is a view explaining a process of mounting the mop to the mop-tilting member of the cleaning module according to the embodiment of the present invention.
Figure 23:
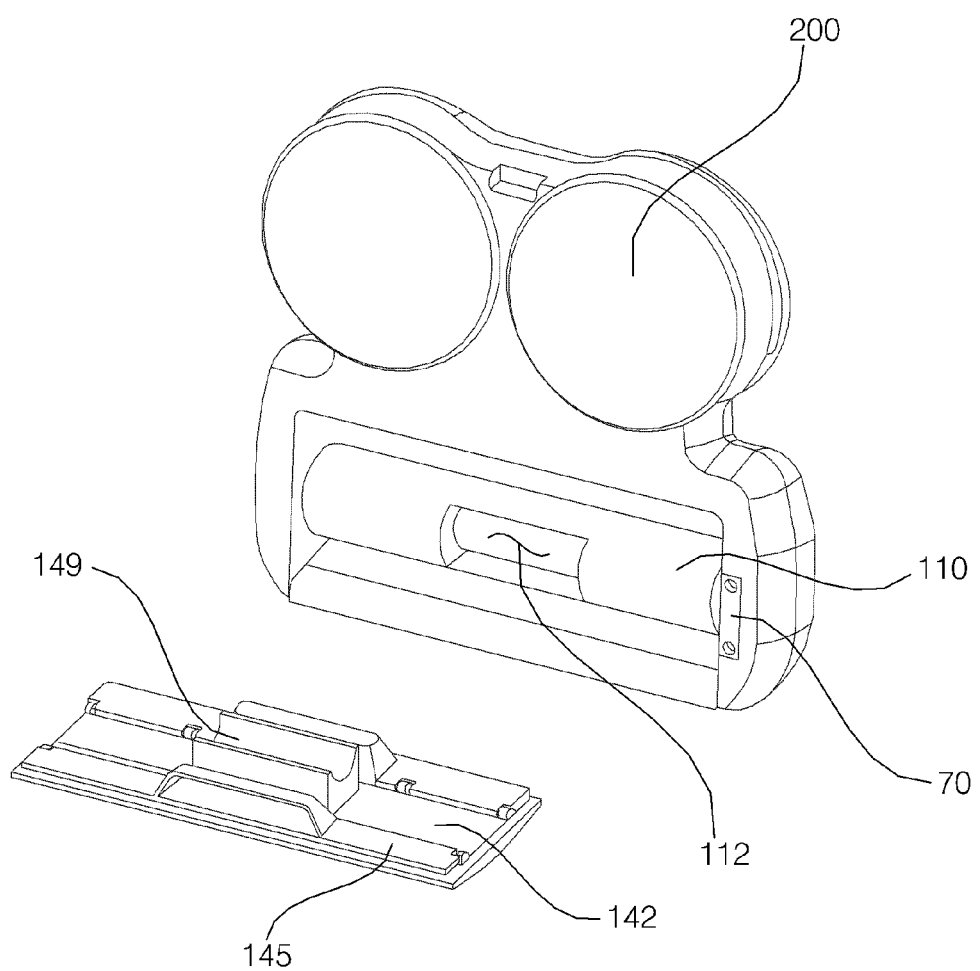
FIG. 23 is a view explaining an example of mounting the mop-tilting member of the cleaning module according to the embodiment of the present invention to the rotational member.
Figure 24:
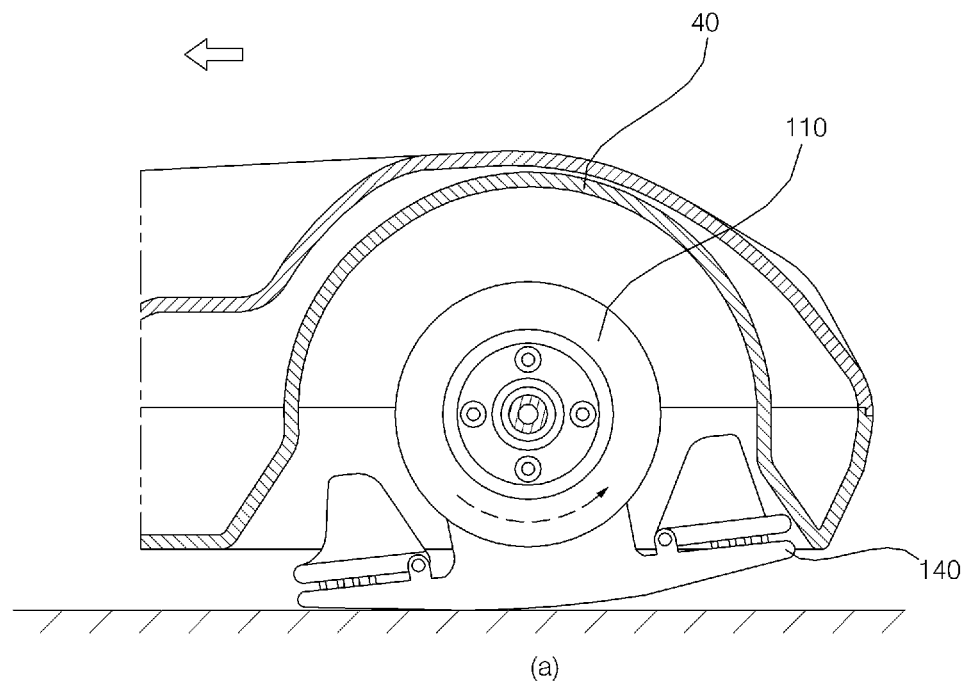
FIG. 24 is a view illustrating disposition of the cleaning module with movement of the robot cleaner according to the embodiment of the present invention.
Figure 24:
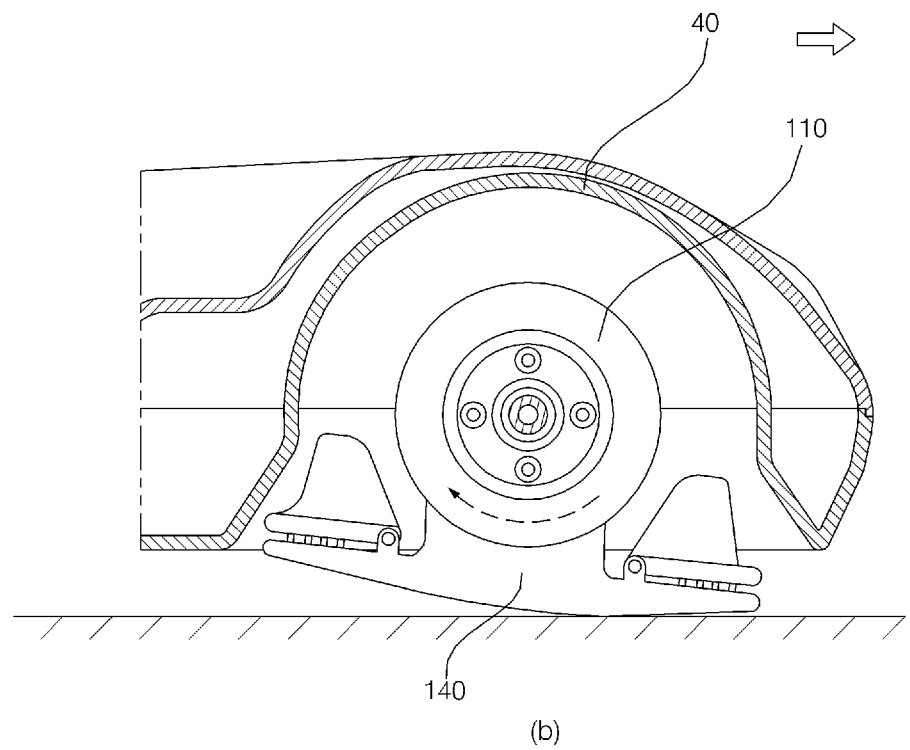

FIG. 19 is a perspective view of the cleaning module according to the embodiment of the present invention. FIG. 20 is a view of a mop-tilting member of the cleaning module according to the embodiment of the present invention. FIG. 21 is a view explaining a process of mounting a mop to the mop-tilting member of the cleaning module according to the embodiment of the present invention. FIG. 22 is a view explaining a process of mounting the mop to the mop-tilting member of the cleaning module according to the embodiment of the present invention. FIG. 23 is a view explaining an example of mounting the mop-tilting member of the cleaning module according to the embodiment of the present invention to the rotational member. FIG. 24 is a view illustrating disposition of the cleaning module with movement of the robot cleaner according to the embodiment of the present invention.

Hereinafter, the construction and operation of the cleaning module according to the embodiment of the present invention will be described with reference to FIGS. 19 to 24.

The cleaning module 100 may perform a mopping operation on the floor while the robot cleaner 10 moves. The cleaning module 100 according to the embodiment defines an angle of inclination with reference to the floor surface such that a portion of the cleaning module 100 is brought into contact with the floor surface. The angle of inclination defined between the cleaning module 100 and the floor surface is varied by the module drive unit. The cleaning module 100 is detachably disposed in the module housing 40.

The cleaning module 100 includes the mop-tilting member 140 for holding a mop, which functions to wipe the floor, the rotational member 110 connected to the rotational protrusion 130 so as to control the angle of inclination of the mop-tilting member 140, the rotational protrusion 130 disposed at one end of the rotational member 110 and connected to the module drive unit 50, and the holding protrusion 120 disposed at the other end of the rotational member 110 so as to support the rotation of the rotational member 110.

The rotational member 110 according to the embodiment has a cylindrical shape. The rotational member 110 is coupled to the mop-tilting member 140 at a portion of the outer peripheral surface thereof. The rotational member 110 is provided in a portion of the outer peripheral surface thereof with a coupling groove 112, into which the end of a coupling portion 149 of the mop-tilting member 140, to be described later, is inserted. The coupling groove 112 has a shape corresponding to the end of the coupling portion 149.

The mop-tilting member 140 is connected to a portion of the outer peripheral surface of the rotational member 110. The rotational protrusion 130 is disposed on one lateral side surface of the rotational member 110, and the holding protrusion 120 is disposed on the other lateral side surface thereof, other than the outer peripheral surface of the rotational member 110. The rotational member 110 is provided in the outer peripheral surface thereof with the coupling groove, into which the end of the mop-tilting member 140 is securely fitted.

The holding protrusion 120 is disposed on the rotational axis of the rotational member 110. The holding protrusion 120 is connected to the rotational member 110 by a bearing, thereby eliminating restriction of rotation of the rotational member 110.

The outer peripheral surface of the holding protrusion 120 has a polygonal shape. The outer peripheral surface of the holding protrusion 120 is surrounded by the holding-protrusion-fitting groove 42 and the coupler 70. The holding protrusion 120 is engaged at the outer peripheral surface thereof with the holding-protrusion-fitting groove 42 and the coupler 70, and is thus held therebetween. Referring to FIG. 19, although the outer peripheral surface of the holding protrusion 120 according to the embodiment is shown as having a hexagonal column shape, this is merely one embodiment, and various modifications thereof are possible, as long as it is possible to hold the holding protrusion in the module housing.

The rotational protrusion 130 transmits rotational force from the module drive unit 50 to the rotational member 110. Accordingly, when the holding-protrusion-connecting member 60, which is connected to the module drive unit, is rotated, the rotational protrusion 130 is rotated with the rotational member 110. The outer peripheral surface of the rotational protrusion 130 has a polygonal shape. The outer peripheral surface of the rotational protrusion 130 is fitted into the recess 61 formed in the rotational-protrusion-connecting member 60. Although the outer peripheral surface of the rotational protrusion according to the embodiment has a square shape, this is one embodiment, and various modifications thereof are possible, as long as it is possible to hold the rotational protrusion in the recess formed in the rotational-protrusion-connecting member.

The cleaning module 100 according to the embodiment performs a mopping operation on the floor in the state in which the mop-tilting member 140 is inclined with respect to the traveling direction of the robot cleaner by means of rotation of the rotational member 110. The mop-tilting member 140 performs a mopping operation on the floor surface using a mop 150 securely attached to the tilting plate. The mop 150 attached to the mop-tilting member 140 may be embodied as a disposable mop cloth or a general mop cloth.

The mop-tilting member 140 includes a tilting plate 142 to which the mop 150 is attached, a mop holder 145 for holding the mop to the tilting plate 142, and the coupling portion, which projects from one side of the tilting plate 142 so as to connecting the tilting plate 142 to the rotational member 110.

The tilting plate 142 has a plate shape, and the mop is attached to one surface of the tilting plate. The tilting plate 142 is provided on one surface thereof with the mop, which is used to perform a mopping operation on the floor, and is provided on the other surface thereof with the mop holder 145 for holding the mop. The mop is held on the other surface of the mop holder 145 in the state of surrounding the one surface of the tilting plate 142. The tilting plate is provided on the other surface thereof with the coupling portion 149 adapted to connect the tilting plate 142 to the rotational member 110. The one surface of the tilting plate 142, on which the mop is disposed, defines a curved surface 142 that is convex outwards.

The tilting plate 142 is provided on the other surface thereof with a pair of mop holders 145 for holding the mop 150 surrounding the one surface of the tilting plate 142. The mop holders 145 are hingedly coupled to the other surface of the tilting plate. The pair of mop holders 145 are disposed at two ends of the other surface of the tilting plate.

Each of the mop holders 145 includes a mop holding plate 146, which is hingedly coupled to the tilting plate, and a knob 147, which enables the mop holding plate to be lifted about the hinge axis. When an external force is not applied to the knob, the mop holding plate 146 is in contact with the tilting plate.

The mop 150 is disposed and held at a portion thereof between the mop holding plate 146 and the tilting plate 142. Referring to FIGS. 21 and 22, a user separates the mop holding plate 146 from the tilting plate by applying a force to the knob. Subsequently, user disposes the mop between the tilting plate 142 and the mop holding plate 146, and then holds the mop therebetween.

The coupling portion 149 projects from the other surface of the tilting plate 142. The coupling portion 149 is connected to the outer peripheral surface of the rotational member 110. The coupling portion 149 is fitted at the end thereof into the coupling groove 112 formed in a portion of the rotational member.

The end of the coupling portion 149 according to the embodiment is concave at the center and projects at opposite ends. The coupling groove 112 formed in the portion of the rotational member 110 has a shape corresponding to the end of the coupling portion 149. The shape of the end of the coupling portion 149 may be variously modified as long as it is possible to hold the mop-tilting member 140 to the rotational member 110.

The coupling portion 149 may be provided at one side or two sides thereof with a fastening protrusion (not shown), which enables the coupling portion 149 to be held in the coupling groove 112. The fastening protrusion is fitted into a fastening recess (not shown) formed in the coupling groove of the rotational member. The end of the coupling portion is coupled to the rotational member in such a manner that the fastening protrusion is fitted into the fastening recess in the rotational member.

Hereinafter, the operation of the cleaning module according to the embodiment will be described with reference to FIG. 24. The mop-tiling member is constructed such that the angle of inclination of the tilting plate with respect to the floor surface is varied by the module drive unit.

The mop-tilting member 140 according to the embodiment of the present invention is able to control the direction that the surface of the tilting plate 142 faces, depending on the traveling direction of the robot cleaner 10. In addition, the mop-tilting member 140 according to the embodiment of the present invention is able to control the angle of inclination of the tilting plate 142 with respect to the floor surface, in consideration of the traveling speed of the robot cleaner.

Referring to FIG. 24, the robot cleaner 10 according to the embodiment of the present invention is able to operate the module drive motor 52 so as to cause the tilting plate 142 of the mop-tilting member 140 to face the floor surface in a direction opposite the traveling direction of the robot cleaner 10. Referring to FIG. 24(a), the mop-tilting member 140 according to the embodiment is constructed such that the one surface of the tilting plate faces rearwards in the state of being inclined with respect to the floor surface when the robot cleaner 10 travels forwards. Referring to FIG. 24(b), the mop-tilting member 140 according to the embodiment is constructed such that the one surface of the tilting plate 142 faces forwards in the state of being inclined with respect to the floor surface when the robot cleaner 10 travels rearwards.

The mop-tilting member 140 according to the embodiment is able to control the angle of inclination of the tilting plate with the floor surface by the module drive motor 52. The mop-tilting member 140 according to the embodiment of the present invention is constructed such that the angle of inclination of the tilting plate 142 is controlled according to the traveling speed of the robot cleaner 10 or the material of the floor surface.

Although a preferred embodiment of the present invention has been illustrated and described, the present invention is not limited to the above-specified embodiment. Those skilled in the art will appreciate that various modifications, additions and substitutions are possible without departing from the scope and spirit of the invention as disclosed in the accompanying claims.

What is claimed is:

1. A robot cleaner comprising:
a main body defining an appearance;
a mover for moving the main body;
a wiper disposed behind the mover and configured to be brought into contact with a floor surface at at least part of a lower surface of the wiper; and
a unit wiper adjuster for controlling an angle of inclination of the lower surface of the wiper with respect to the floor surface, wherein the mover comprises:
a pair of spin-mops configured to be rotated in a state of being in contact with the floor surface so as to perform a mopping operation;
a spin-mop drive for rotating the pair of spin-mops; and
a water supply for supplying stored liquid to each of the pair of spin-mops,
wherein each of the spin-mops comprises:
a rotating plate;
a mop pad attached to a lower side of the rotating plate;
a rotating shaft protruding upward from the rotating plate and connected to the spin-mop drive;
a suspension base connected to the rotating plate and configured to control an inclination of the rotating plate;
a nozzle connected to the water supply to supply water to the mop pad; and
a water collection guide for collecting the stored water supplied from the nozzle,
wherein the wiper comprises:
a tilting plate to which a mop is attached;
a mop holder for holding the mop to the tilting plate;
a roller connected to the wiper adjuster and configured to control an angle of inclination of the tilting plate; and
a roller-coupling portion projecting from a portion of the tilting plate and connected to the roller,
wherein each of the pair of spin-mops is disposed so that regions of each of the spin-mops located at a distance from each other are inclined to be close to the floor surface,
wherein the tilting plate is disposed to be inclined in the traveling direction of the main body by rotation of the roller, and
wherein the pair of spin-mops is disposed in front of the tilting plate to mop the floor surface.

2. The robot cleaner according to claim 1, wherein the tilting plate is convex outwards at one surface thereof that faces the floor surface.

3. The robot cleaner according to claim 1, wherein the mop holder is hingedly coupled to a portion of the tilting plate.

4. The robot cleaner according to claim 1, wherein the wiper comprises:
a rotational protrusion disposed at a side of the roller and connected to the wiper adjuster; and
a holding protrusion disposed at another side of the roller and configured to support rotation of the roller.

5. The robot cleaner according to claim 4, wherein the wiper further comprises a coupler for coupling the wiper to a side of the main body.

6. The robot cleaner according to claim 5, wherein the main body includes a module housing defining a space in which a portion of the wiper is received,
the module housing is provided at a side thereof with a holding-protrusion-fitting groove into which the holding protrusion is fitted, and
the holding-protrusion-fitting groove and the coupler jointly hold the holding protrusion disposed at another side of the roller.

7. The robot cleaner according to claim 1, wherein the water supply includes a storage container for storing the stored liquid to be supplied to the spin-mop, and
wherein a flow channel is formed between the storage container and the pair of spin-mops so as to allow the stored liquid to flow therethrough.

8. The robot cleaner according to claim 7, wherein the water supply comprises:
a pump for supplying the liquid stored in the storage container to the pair of spin-mops; and
a controller for controlling an amount of the stored liquid, which is supplied to the pair of spin-mops by the pump.

9. The robot cleaner according to claim 1, wherein the wiper adjuster is configured to control a direction that a surface of the tilting plate faces, depending on a traveling direction of the robot cleaner.

10. The robot cleaner according to claim 1, wherein the wiper adjuster is configured to cause the tilting plate to face the floor surface in a direction opposite to a traveling direction of the robot cleaner.

* * * * *